US012615167B2

(12) United States Patent
Pang et al.

(10) Patent No.: US 12,615,167 B2
(45) Date of Patent: *Apr. 28, 2026

(54) MULTICAST COMMUNICATION METHOD AND RELATED APPARATUS

(71) Applicant: Huawei Technologies Co., Ltd., Shenzhen (CN)

(72) Inventors: Donglei Pang, Beijing (CN); Cheng Sheng, Beijing (CN); Haibo Wang, Beijing (CN); Fanghong Duan, Nanjing (CN); Gang Yan, Beijing (CN); Shunwan Zhuang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

This patent is subject to a terminal disclaimer.

(21) Appl. No.: 18/316,734

(22) Filed: May 12, 2023

(65) Prior Publication Data

US 2023/0370293 A1    Nov. 16, 2023

(30) Foreign Application Priority Data

May 13, 2022    (CN) .......................... 202210523662.1
Aug. 16, 2022    (CN) .......................... 202210983137.8

(51) Int. Cl.
*H04L 45/16*        (2022.01)
*H04L 12/18*        (2006.01)
*H04L 12/46*        (2006.01)
*H04L 45/74*        (2022.01)

(52) U.S. Cl.
CPC .......... *H04L 12/18* (2013.01); *H04L 12/4633* (2013.01); *H04L 45/16* (2013.01); *H04L 45/74* (2013.01)

(58) Field of Classification Search
CPC .......................... H04L 45/741; H04L 12/2854
USPC ......................................................... 370/389
See application file for complete search history.

(56) References Cited

U.S. PATENT DOCUMENTS

2019/0394055 A1 * 12/2019 Zhang ..................... H04L 69/22

FOREIGN PATENT DOCUMENTS

CN        112119616 B  *  5/2022  ............. H04L 45/48
WO        2019214589 A1    11/2019

* cited by examiner

*Primary Examiner* — Sibte H Bukhari
(74) *Attorney, Agent, or Firm* — Slater Matsil, LLP

(57) ABSTRACT

A multicast communication method is applied to a software-defined wide area network SD-WAN. In the multicast communication method, a bit index explicit replication (Bit Index Explicit Replication, BIER) capability is deployed on site devices in the SD-WAN, a BIER header in a multicast packet indicates a site device that a multicast packet needs to pass through, and no multicast distribution tree need to be constructed. In addition, the multicast packet is forwarded through an SD-WAN tunnel between site devices, and an intermediate node does not need to sense a multicast service, to reduce a quantity of multicast table entries on a network device and accelerate convergence of the multicast table entries, so that normal running of the multicast service is ensured.

20 Claims, 13 Drawing Sheets

Forwarding table

| Destination address | Egress interface | Peer site identifier |
|---|---|---|
| IP address 1 | SD-WAN tunnel 1 | Site 1 |
| IP address 2 | SD-WAN tunnel 2 | Site 3 |
| IP address 3 | SD-WAN tunnel 3 | Site 4 |

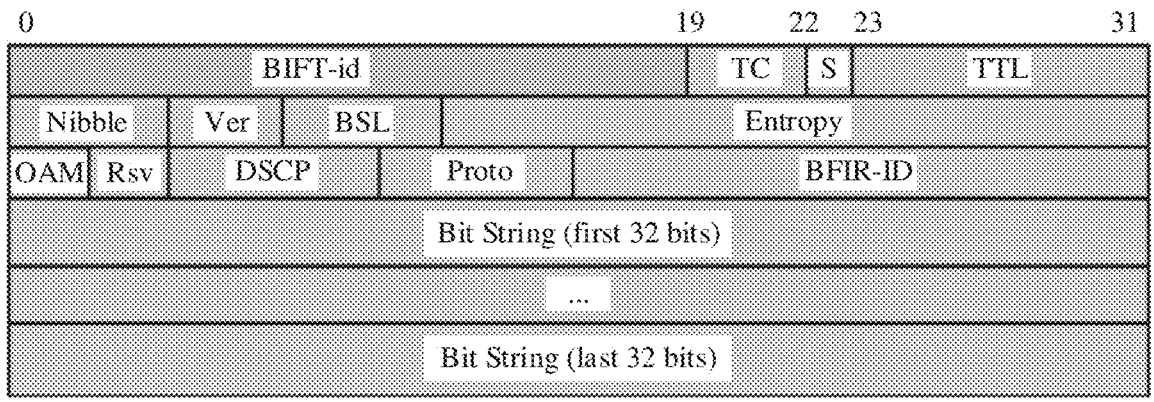

| 0 | | | 19 | 22 | 23 | 31 |
|---|---|---|---|---|---|---|
| BIFT-id | | | TC | S | TTL | |
| Nibble | Ver | BSL | Entropy | | | |
| OAM | Rsv | DSCP | Proto | BFIR-ID | | |
| Bit String (first 32 bits) | | | | | | |
| ... | | | | | | |
| Bit String (last 32 bits) | | | | | | |

FIG. 11

 1200

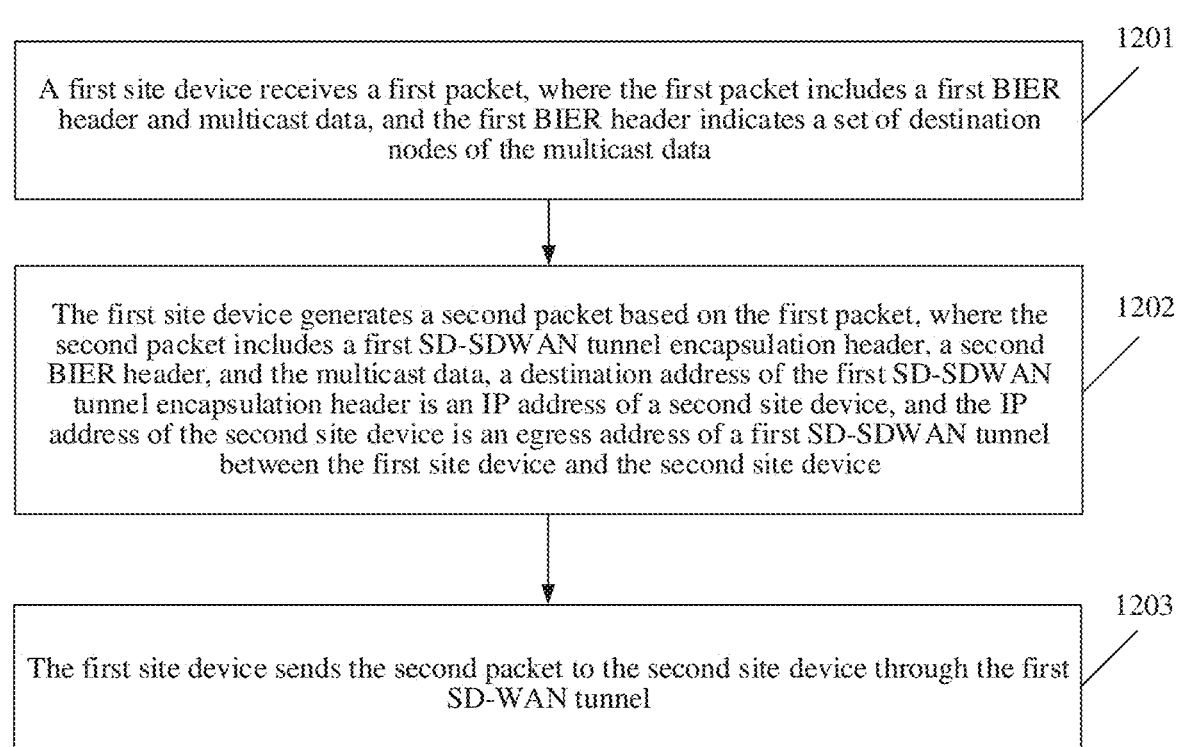

A first site device receives a first packet, where the first packet includes a first BIER header and multicast data, and the first BIER header indicates a set of destination nodes of the multicast data                                                                        1201

The first site device generates a second packet based on the first packet, where the second packet includes a first SD-SDWAN tunnel encapsulation header, a second BIER header, and the multicast data, a destination address of the first SD-SDWAN tunnel encapsulation header is an IP address of a second site device, and the IP address of the second site device is an egress address of a first SD-SDWAN tunnel between the first site device and the second site device                                                1202

The first site device sends the second packet to the second site device through the first SD-WAN tunnel                                                                        1203

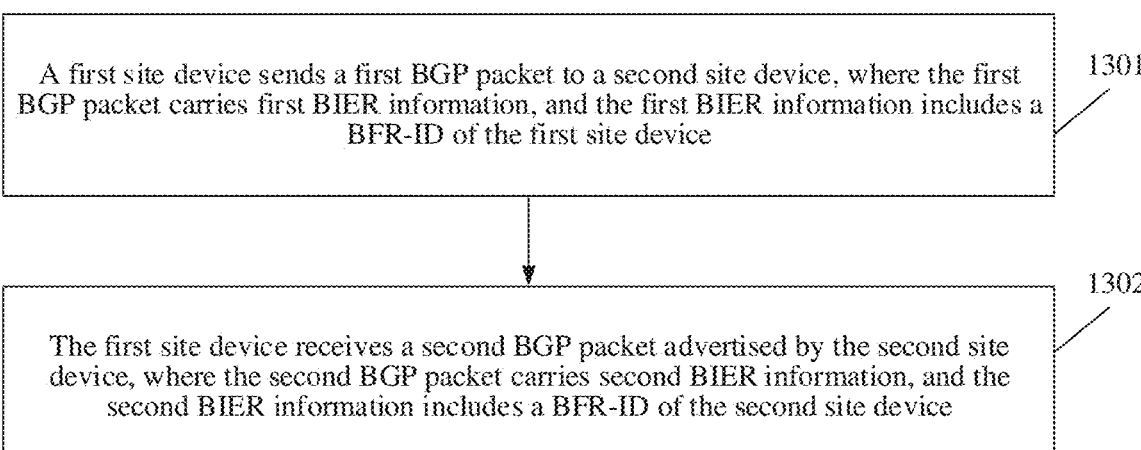

A first site device sends a first BGP packet to a second site device, where the first BGP packet carries first BIER information, and the first BIER information includes a BFR-ID of the first site device — 1301

The first site device receives a second BGP packet advertised by the second site device, where the second BGP packet carries second BIER information, and the second BIER information includes a BFR-ID of the second site device — 1302

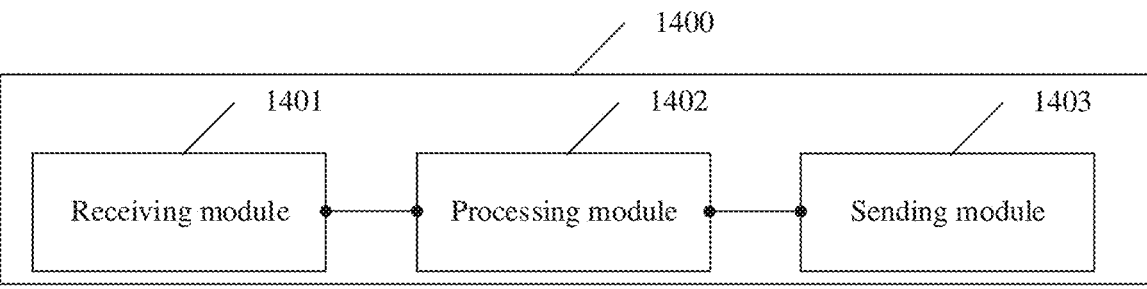

| Receiving module 1401 | Processing module 1402 | Sending module 1403 |

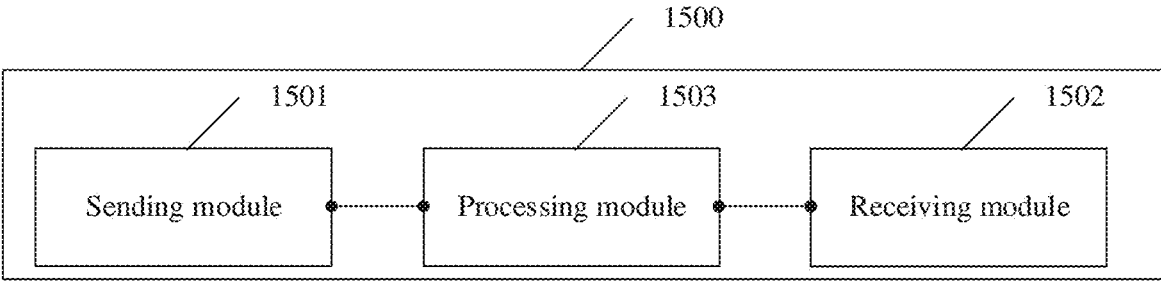

| Sending module 1501 | Processing module 1503 | Receiving module 1502 |

FIG. 15

MULTICAST COMMUNICATION METHOD AND RELATED APPARATUS

CROSS-REFERENCE TO RELATED APPLICATION

This application claims priority to Chinese Patent Application No. 202210523662.1, filed on May 13, 2022 and Chinese Patent Application No. 202210983137.8, filed on Aug. 16, 2022. Both of the aforementioned applications are hereby incorporated by reference in their entireties.

TECHNICAL FIELD

This application relates to the Internet technologies, and in particular, to a multicast communication method and a related apparatus.

BACKGROUND

A software-defined wide area network (Software-Defined Wide Area Network. SD-WAN) is a network formed by applying software-defined network (Software-Defined Network, SDN) technologies to wide area network scenarios. Specifically, based on bearer networks such as operator networks and dedicated networks, points of presence (Point of Presence, POP) are added, and links between POPs over a bearer network are abstracted into a logical link. In this way, an SD-WAN can be constructed from POPs and logical links between the POPs.

Generally, an SD-WAN includes a plurality of customer-premises equipments (customer-premises equipments, CPEs). CPE is an edge device of a customer network, is configured to bear service traffic of customers, and is connected to a network through a POP.

Currently, a manner of implementing a multicast service in the SD-WAN is to deploy the protocol independent multicast (Protocol Independent Multicast, PIM) protocol on all CPEs, and establish a PIM multicast distribution tree for each multicast stream on a network through the CPEs. With large-scale deployment of multicast services, a quantity of to-be-maintained multicast distribution trees increases sharply, and all node devices on the multicast distribution trees need to store a large quantity of multicast stream states, to be specific, there are a large quantity of multicast table entries on the node devices. Consequently, the multicast table entries on the node device converge slowly when the network changes, affecting normal running of the multicast service.

SUMMARY

This application provides a multicast communication method and a related apparatus, to reduce a quantity of multicast table entries on a network device and accelerate convergence of the multicast table entries, so that normal running of a multicast service is ensured.

This application provides a multicast communication method. The multicast communication method is applied to an SD-WAN. The multicast communication method includes: A first site device in the SD-WAN receives a first packet. The first packet includes a first bit index explicit replication (Bit Index Explicit Replication, BIER) header and multicast data, and the first BIER header indicates a set of destination nodes of the multicast data.

The first site device generates a second packet based on the first packet. The second packet includes a first SD-WAN tunnel encapsulation header, a second BIER header, and the multicast data. A destination address of the first SD-WAN tunnel encapsulation header is an IP address of a second site device. The IP address of the second site device is an egress address of a first SD-WAN tunnel between the first site device and the second site device. The first SD-WAN tunnel encapsulation header indicates another network device between the first site device and the second site device to forward the second packet to the second site device. In addition, a second BIER header indicates the set of destination nodes of the multicast data.

After generating the second packet, the first site device sends the second packet to the second site device through the first SD-WAN tunnel.

In this solution, a BIER capability is deployed on site devices in the SD-WAN, a BIER header in a multicast packet indicates a site device that the multicast packet needs to pass through, and no multicast distribution tree needs to be constructed. In addition, the multicast packet is forwarded through an SD-WAN tunnel between site devices, and an intermediate node does not need to sense a multicast service, to reduce a quantity of multicast table entries on a network device and accelerate convergence of the multicast table entries on the node device, so that normal running of the multicast service is ensured.

In a possible implementation, an extended generic routing encapsulation (Generic Routing Encapsulation, GRE) header is further encapsulated between the first SD-WAN tunnel header and the second BIER header, and a protocol type field in the extended GRE header indicates that a next header (next header) of the extended GRE header is a BIER header.

In this solution, the extended GRE header is encapsulated between the SD-WAN tunnel header and the BIER header, and the extended GRE header indicates that the next header is a BIER header. Therefore, modifications to the conventional technologies are reduced as much as possible while implementing coupling between the SD-WAN tunnel and BIER forwarding, to improve implementability of the solution.

In a possible implementation, the method further includes: The first site device determines, based on a bit string in the first BIER header and a BIER forwarding table, that a next-hop site is a first site. A target site device is located in the first site. The first site device determines, based on the first site, to send the second packet to the second site device through the first SD-WAN tunnel.

In this solution, if a site device has the BIER capability, the site device first determines a next-hop site based on a BIER forwarding table, and then determines, based on a mapping relationship between the next-hop site and an SD-WAN tunnel, an SD-WAN tunnel for forwarding a multicast packet. In this way, coupling between the SD-WAN tunnel and the BIER multicast is implemented, to ensure that an intermediate node does not need to sense a multicast service and reduce deployment complexity of a multicast service.

In a possible implementation, the method further includes: The first site device sends first BIER information to a third site device. The first BIER information includes at least one of the following information: a BIER forwarding router identifier (BIER-Forwarding Router Identity, BFR-ID) of the first site device and a BIER forwarding router advertisement prefix (BFR-Prefix) of the first site device. The first site device receives second BIER information advertised by the target site device. The second BIER information includes one or more of the following information: a BFR-ID of the target site device and a BFR-prefix of the target site device.

In this solution, the first site device sends BIER information to another site device and receives BIER information advertised by the another site device, so that the site devices can generate a BIER forwarding table for guiding BIER packet forwarding, to complete multicast forwarding in the SD-WAN network.

In a possible implementation, the first BIER information or the second BIER information is carried in a border gateway protocol (Border Gateway Protocol, BGP) packet.

In a possible implementation, the BGP packet includes a BGP shortest path first (shortest path first, SPF) address family packet, a BGP link state (link state. LS) address family packet, or a BGP SD-WAN address family packet.

In a possible implementation, the first BIER information or the second BIER information is carried in a prefix network layer reachability information (Prefix Network Layer Reachability Information, Prefix NLRI) field in a BGP SPF address family packet or a BGP LS address family packet. In actual applications, the BIER information may also be carried in an extended manner on another TLV in a BGP SPF address family packet or a BGP LS address family packet.

In a possible implementation, the first BIER information or the second BIER information may alternatively be carried in an extended SD-WAN NLRI attribute field in a BGP SD-WAN address family packet.

In this solution, BIER information is carried in an extended BGP packet, to enable the site devices in the SD-WAN network to advertise BIER information to each other, so that implementability of BIER multicast forwarding can be ensured, and modifications to the conventional technologies are reduced as much as possible.

In a possible implementation, the method further includes: The first site device generates a third packet based on the first packet. The third packet includes a second SD-WAN tunnel encapsulation header, a third BIER header, and the multicast data. A destination address of the second SD-WAN tunnel encapsulation header is an IP address of a third site device. The IP address of the third site device is an egress address of a second SD-WAN tunnel between the first site device and the third site device. The third BIER header indicates the set of destination nodes of the multicast data. The first site device sends the third packet to the third site device through the second SD-WAN tunnel.

In this solution, after receiving the first packet, the first site device can determine a multicast forwarding path of the multicast data based on indication of the first BIER header in the first packet, to replicate the multicast data and forward the multicast data to a corresponding site device, so that normal running of the multicast service is ensured.

In a possible implementation, the first site device is customer-premises equipment CPE or a point of presence POP site device.

A second aspect of this application provides a multicast communication method. The method is applied to an SD-WAN. The method specifically includes: A second site device receives, through a first SD-WAN tunnel, a first packet sent by a first site device. The first packet includes a first SD-WAN tunnel encapsulation header, a first BIER header, and multicast data. A destination address of the first SD-WAN tunnel encapsulation header is an IP address of the second site device. The IP address of the second site device is an egress address of the first SD-WAN tunnel between the first site device and the second site device. The second BIERv6 header indicates a set of destination nodes of the multicast data. The second site device generates a second packet based on the first packet. The second packet includes the multicast data. The second site device forwards the second packet.

In this solution, a BIER capability is deployed on site devices in the SD-WAN, a BIER header in a multicast packet indicates the site device that a multicast packet needs to pass through, and no multicast distribution tree needs to be constructed. In addition, the multicast data is received and forwarded through an SD-WAN tunnel between site devices, and an intermediate node does not need to sense a multicast service, to reduce a quantity of multicast table entries on a network device and accelerate convergence of the multicast table entries, so that normal running of the multicast service is ensured.

In a possible implementation, an extended GRE header is further encapsulated between the first SD-WAN tunnel header and the first BIER header, and a protocol type field in the extended GRE header indicates that a next header next header of the extended GRE header is a BIER header.

In a possible implementation, the second packet includes a second SD-WAN tunnel encapsulation header, a second BIER header, and the multicast data. A destination address of the second SD-WAN tunnel encapsulation header is an IP address of a third site device. The IP address of the third site device is an egress address of a second SD-WAN tunnel between the second site device and the third site device. The second BIER header indicates the set of destination nodes of the multicast data. That the second site device forwards the second packet includes: The second site device sends the second packet to the third site device through the second SD-WAN tunnel.

A third aspect of this application provides a multicast communication method. The method is applied to an SD-WAN. The method includes: A first site device sends a first BGP packet to a second site device. The first BOP packet carries first BIER information. The first BIER information includes a BIER forwarding router identifier BFR-ID of the first site device. The first site device receives a second BGP packet advertised by the second site device. The second BGP packet carries second BIER information. The second BIER information includes a BFR-ID of the second site device. The first site device generates a first BIER forwarding table entry based on the second BGP packet. The first BIER forwarding table entry records a mapping relationship between the BFR-ID of the second site device and a next-hop site. A BFR-ID in the first BIER forwarding table entry indicates a destination device of BIER forwarding.

Specifically, the destination device is represented by the BFR-ID of the second site device, and the next-hop site is calculated by using the second site device as a destination address and based on a topology of the SD-WAN. For site devices in the SD-WAN, each site device advertises, to another site device, information about an SD-WAN tunnel established between the site device and the another site device. Therefore, after the first site device receives SD-WAN tunnel information advertised by other site devices, the first site device can obtain tunnel connection relationships between the site devices in the SD-WAN, to be specific, obtain the topology of the entire SD-WAN. In this way, when using the second site device as a destination address, the first site device can calculate, based on the topology of the SD-WAN, the next-hop site of the second site device.

In a possible implementation, the method further includes: The second site device generates a second BIER forwarding table entry based on the first BGP packet. The second BIER forwarding table entry records a mapping relationship between the BFR-4D of the first site device and a next-hop site. A BFR-ID in the second BIER forwarding table entry indicates a destination device of BIER forwarding.

In a possible implementation, the method further includes: The first site device determines, based on a topology of an SD-WAN, to reach a next-hop site of the second site device.

In a possible implementation, the method further includes: The first site device receives first SD-WAN tunnel information advertised by the third site device. The first SD-WAN tunnel information includes an IP address of the third site device and information about a site to which the third site device belongs. The first site device establishes a first SD-WAN tunnel between the first site device and the third site device based on the first SD-WAN tunnel information, and stores a first mapping relationship between a next-hop site and the first SD-WAN tunnel. The next-hop site in the first mapping relationship is the site to which the third site device belongs.

To be specific, when the first site device establishes the first SD-WAN tunnel with the third site device, if the next-hop site of the first site device is the third site device, an egress interface of the first site device may point to the first SD-WAN tunnel between the first site device and the third site device, to be specific, a packet can be forwarded to a corresponding next-hop site through the first SD-WAN tunnel.

In a possible implementation, the method further includes: The third site device receives second SD-WAN tunnel information advertised by the second site device. The second SD-WAN tunnel information includes an IP address of the second site device and information about a site to which the second site device belongs. The third site device establishes a second SD-WAN tunnel between the third site device and the second site device based on the second SD-WAN tunnel information, and stores a second mapping relationship between a next-hop site and the second SD-WAN tunnel. The next-hop site in the second mapping relationship is the site to which the second site device belongs.

To be specific, the second SD-WAN tunnel is further established between the third site device and the second site device. The third site device may establish the second mapping relationship between the next-hop site and the second SD-WAN tunnel, so that when a next-hop site of a packet is the second site device, the packet is sent through the second SD-WAN tunnel.

In a possible implementation, the method further includes: The first site device receives third SD-WAN tunnel information advertised by the second site device. The third SD-WAN tunnel information includes an IP address of the second site device and information about a site to which the second site device belongs. The first site device establishes a third SD-WAN tunnel between the first site device and the second site device based on the third SD-WAN tunnel information, and stores a third mapping relationship between a next-hop site and the third SD-WAN tunnel. The next-hop site in the third mapping relationship is the site to which the second site device belongs.

In a possible implementation, the method further includes: The first site device receives a first BIER packet. The first BIER packet includes a first BIER header and multicast data. The first BIER header indicates a set of destination nodes of the multicast data. The first site device determines, based on the first BIER header, the first BIER forwarding table entry, and the first mapping relationship, to forward the multicast data through the first SD-WAN tunnel.

In a possible implementation, the method further includes: The first site device receives a first BIER packet, where the first BIER packet includes a first BIER header and multicast data, and the first BIER header indicates a set of destination nodes of the multicast data. The first site device determines, based on the first BIER header, the first BIER forwarding table entry, and the third mapping relationship, to forward the multicast data through the third SD-WAN tunnel.

A fourth aspect of this application provides a communication apparatus. The communication apparatus belongs to a first site device in an SD-WAN. The communication apparatus includes: a receiving module, configured to receive a first packet, where the first packet includes a first bit index explicit replication BIER header and multicast data, and the first BIER header indicates a set of destination nodes of the multicast data; a processing module, configured to generate a second packet based on the first packet, where the second packet includes a first SD-WAN tunnel encapsulation header, a second BIER header, and the multicast data, a destination address of the first SD-WAN tunnel encapsulation header is an IP address of a second site device, the IP address of the second site device is an egress address of a first SD-WAN tunnel between the first site device and the second site device, and the second BIER header indicates the set of destination nodes of the multicast data; and a sending module, configured to send the second packet to the second site device through the first SD-WAN tunnel.

In a possible implementation, an extended generic routing encapsulation GRE header is further encapsulated between the first SD-WAN tunnel header and the second BIER header, and a protocol type field in the extended GRE header indicates that a next header next header of the extended GRE header is a BIER header.

In a possible implementation, the processing module is further configured to: determine, based on a bit string in the first BIER header and a BIER forwarding table, that a next-hop site is a first site, where a target site device is located in the first site: and determine, based on the first site, to send the second packet to the second site device through the first SD-WAN tunnel.

In a possible implementation, the sending module is further configured to send first BIER information to a third site device. The first BIER information includes at least one of the following information: a BIER forwarding router identifier BFR-ID of the first site device and a BIER forwarding router advertisement prefix BFR-prefix of the first site device. The receiving module is further configured to receive second BIER information advertised by the target site device. The second BIER information includes one or more of the following information: a BFR-ID of the target site device and a BFR-prefix of the target site device.

In a possible implementation, the first BIER information or the second BIER information is carried in a BGP packet.

In a possible implementation, the BGP packet includes a BGP shortest path first SPF address family packet, a BGP link state LS address family packet, or a BGP SD-WAN address family packet.

In a possible implementation, the first BIER information or the second BIER information is carried in a prefix network layer reachability information prefix NLRI field in the BGP SPF address family packet or the BGP LS address family packet.

In a possible implementation, the processing module is further configured to generate a third packet based on the first packet. The third packet includes a second SD-WAN tunnel encapsulation header, a third BIER header, and the multicast data. A destination address of the second SD-WAN tunnel encapsulation header is an IP address of a third site device. The IP address of the third site device is an egress address of a second SD-WAN tunnel between the first site device and the third site device. The third BIER header indicates the set of destination nodes of the multicast data. The sending module is further configured to send the third packet to the third site device through the second SD-WAN tunnel.

In a possible implementation, the first site device is CPE or a POP site device.

A fifth aspect of this application provides a communication apparatus. The communication apparatus belongs to a second site device in an SD-WAN. The communication apparatus includes: a receiving module, configured to receive, through a first SD-WAN tunnel, a first packet sent by a first site device, where the first packet includes a first SD-WAN tunnel encapsulation header, a first BIER header, and multicast data, a destination address of the first SD-WAN tunnel encapsulation header is an IP address of the second site device, the IP address of the second site device is an egress address of the first SD-WAN tunnel between the first site device and the second site device, and the second BIERv6 header indicates a set of destination nodes of the multicast data: a processing module, configured to generate a second packet based on the first packet, where the second packet includes the multicast data: and a sending module, configured to forward the second packet.

In a possible implementation, an extended GRE header is further encapsulated between the first SD-WAN tunnel header and the first BIER header, and a protocol type field in the extended GRE header indicates that a next header next header of the extended GRE header is a BIER header.

In a possible implementation, the second packet includes a second SD-WAN tunnel encapsulation header, a second BIER header, and the multicast data. A destination address of the second SD-WAN tunnel encapsulation header is an IP address of a third site device. The IP address of the third site device is an egress address of a second SD-WAN tunnel between the second site device and the third site device. The second BIER header indicates the set of destination nodes of the multicast data. The sending module is further configured to send the second packet to the third site device through the second SD-WAN tunnel.

A sixth aspect of this application provides a communication apparatus. The communication apparatus belongs to a first site device in an SD-WAN. The communication apparatus includes: a sending module, configured to send a first BGP packet to a second site device, where the first BGP packet carries first BIER information, and the first BIER information includes a BIER forwarding router identifier BFR-ID of the first site device; a receiving module, configured to receive a second BGP packet advertised by the second site device, where the second BGP packet carries second BIER information, and the second BIER information includes a BFR-ID of the second site device; and a processing module, configured to generate a first BIER forwarding table entry based on the second BOP packet, where the first BIER forwarding table entry records a mapping relationship between the BFR-ID of the second site device and a next-hop site, and a BFR-ID in the first BIER forwarding table entry indicates a destination device of BIER forwarding.

In a possible implementation, the processing module is further configured to determine, based on a topology of an SD-WAN, to reach a next-hop site of the second site device.

In a possible implementation, the receiving module is further configured to receive first SD-WAN tunnel information advertised by the third site device. The first SD-WAN tunnel information includes an IP address of the third site device and information about a site to which the third site device belongs. The processing module is further configured to establish a first SD-WAN tunnel between the first site device and the third site device based on the first SD-WAN tunnel information, and storing a first mapping relationship between a next-hop site and the first SD-WAN tunnel. The next-hop site in the first mapping relationship is the site to which the third site device belongs.

In a possible implementation, the receiving module is further configured to receive third SD-WAN tunnel information advertised by the second site device. The third SD-WAN tunnel information includes an IP address of the second site device and information about a site to which the second site device belongs. The processing module is further configured to establish a third SD-WAN tunnel between the first site device and the second site device based on the third SD-WAN tunnel information, and store a third mapping relationship between a next-hop site and the third SD-WAN tunnel. The next-hop site in the third mapping relationship is the site to which the second site device belongs.

In a possible implementation, the receiving module is further configured to receive a first BIER packet. The first BIER packet includes a first BIER header and multicast data, and the first BIER header indicates a set of destination nodes of the multicast data. The processing module is further configured to determine, based on the first BIER header, the first BIER forwarding table entry, and the first mapping relationship, to forward the multicast data through the first SD-WAN tunnel.

In a possible implementation, the receiving module is further configured to receive a first BIER packet. The first BIER packet includes a first BIER header and multicast data, and the first BIER header indicates a set of destination nodes of the multicast data. The processing module is further configured to determine, based on the first BIER header, the first BIER forwarding table entry, and the third mapping relationship, to forward the multicast data through the third SD-WAN tunnel.

A seventh aspect of this application provides a communication apparatus, including a receiving module, a processing module, and a sending module. The receiving module is configured to perform a receiving operation in any implementation of the first aspect, the second aspect, or the third aspect. The processing module is configured to perform a processing operation in any implementation of the first aspect, the second aspect, or the third aspect. The sending module is configured to perform a sending operation in any implementation of the first aspect, the second aspect, or the third aspect.

Alternatively, the receiving module is configured to perform an operation performed by a receiving module in any implementation of the fourth aspect, the fifth aspect, or the sixth aspect; the processing module is configured to perform an operation performed by a processing module in any implementation of the fourth aspect, the fifth aspect, or the sixth aspect; and the sending module is configured to perform an operation performed by a sending module in any implementation of the fourth aspect, the fifth aspect, or the sixth aspect.

In a possible implementation, the communication apparatus belongs to a site device in an SD-WAN.

The communication apparatus in the fourth aspect to the seventh aspect may be a processor or a chip system in a site device, and is configured to perform a receiving operation, a processing operation, and a sending operation in the fourth aspect to the seventh aspect. Alternatively, the communication apparatus in the fourth aspect to the seventh aspect may be a site device. For example, the communication apparatus is specifically a network device such as a switch, a gateway, a router, or a hub. A specific form of the communication apparatus is not limited in this application.

An eighth aspect of this application provides a communication system, including a first communication apparatus and a second communication apparatus. The first communication apparatus is configured to perform an operation performed by the first site device in the first aspect or the third aspect, and the second communication apparatus is configured to perform an operation performed by the second site device in the second aspect.

A ninth aspect of this application provides a computer-readable storage medium, storing instructions. When the instructions are run on a processor, the method according to any implementation of the first aspect to the third aspect is implemented.

A tenth aspect of this application provides a computer program product. When the computer program product is run on a processor, the method according to any implementation of the first aspect to the third aspect is implemented.

An eleventh aspect of this application provides a chip, including one or more processors. Some or all of the processors are configured to read and execute computer instructions stored in a memory, to perform the method in any possible implementation of any one of the foregoing aspects. Optionally, the chip further includes the memory. Optionally, the chip further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. Optionally, the communication interface is an input/output interface or a bus interface. The method provided in this application is implemented by one chip, or is implemented by a plurality of chips in cooperation.

The solutions provided in the second aspect to the eleventh aspect are for implementing or collaboratively implementing the method provided in the first aspect, and therefore, can achieve advantageous effects the same as or corresponding to those in the first aspect. Details are not described herein again.

BRIEF DESCRIPTION OF DRAWINGS

FIG. 11 is a schematic diagram of a format of a BIER header according to an embodiment of this application;

FIG. 12 is a schematic flowchart of a multicast communication method 1200 according to an embodiment of this application;

FIG. 13 is a schematic flowchart of a multicast communication method 1300 according to an embodiment of this application;

FIG. 14 is a schematic diagram of a structure of a network device 1400 according to an embodiment of this application;

FIG. 15 is a schematic diagram of a structure of a network device 1500 according to an embodiment of this application;

DESCRIPTION OF EMBODIMENTS

Figure 1:
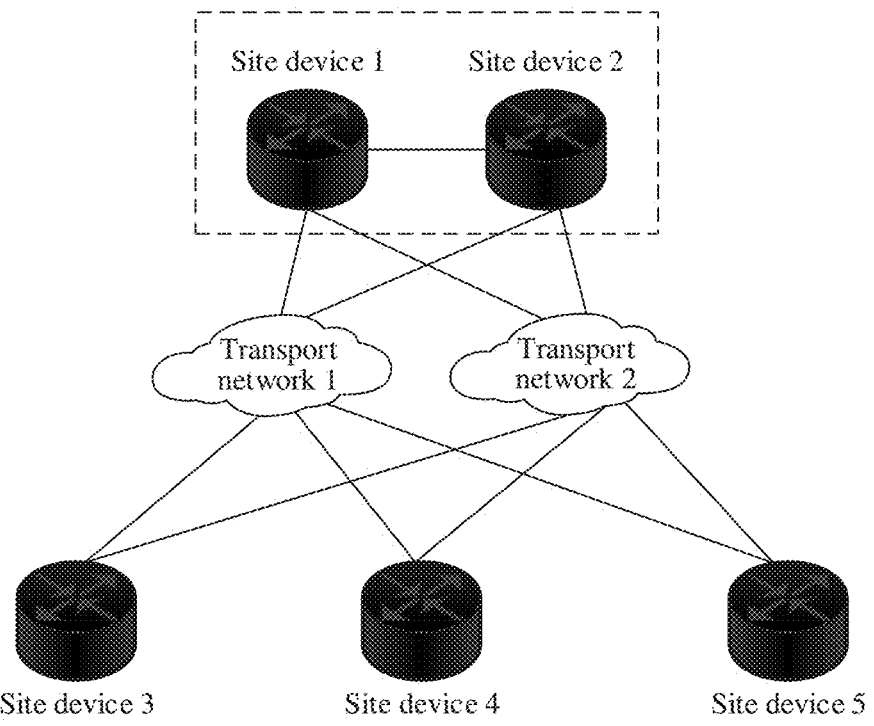
FIG. 1 is a schematic diagram of an SD-WAN network according to an embodiment of this application.

To make the objectives, technical solutions, and advantages of this application clearer and more comprehensible, the following describes embodiments of this application with reference to the accompanying drawings. It is clearly that described embodiments are merely some but not all of embodiments of this application. A person of ordinary skill in the art may learn that, as a new application scenario emerges, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the descriptions termed in such a manner are interchangeable in proper cases so that embodiments can be implemented in another order than the order illustrated or described in this application. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a time/logical sequence indicated by the names or numbers. An execution order of the steps in the procedure that have been named or numbered can be changed based on a technical objective to be achieved, provided that same or similar technical effects can be achieved. Unit division in this application is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected according to actual requirements to achieve the objectives of the solutions of this application.

For ease of understanding, the following first describes some technologies in embodiments of this application.

(1) SD-WAN

An SD-WAN is a network formed by applying SDN technologies to wide area network scenarios. The SD-WAN aims to reduce WAN costs and improve network connection flexibility, to provide secure and reliable interconnection services for enterprise networks and data center networks that are scattered in a wide geographical area.

FIG. 1 is a schematic diagram of an SD-WAN network according to an embodiment of this application. As shown in FIG. 1, the SD-WAN network includes a site device 1 to a site device 5. The site device 1 to the site device 5 are all connected to a transport network 1 and a transport network 2. In addition, the site device 1 may be connected to the site device 3 to the site device 5 through the transport network 1 and the transport network 2, and the site device 2 may also be connected to the site device 3 to the site device 5 through the transport network 1 and the transport network 2. The site device 1 and the site device 2 are, for example, headquarters site devices, and the site device 3 to the site device 5 are, for example, branch site devices. The site device 1 and the site device 2 serving as the headquarters site devices may distribute data to the site device 3 to the site device 5 serving as the branch site devices. Alternatively, the site device 1 and the site device 2 serve as intermediate nodes to forward data transmitted between the branch site devices.

The site device 1 to the site device 5 may be CPEs or POP site devices. The transport network 1 and the transport network 2 are wide area access networks provided by an operator, and implement interconnection between site devices. For example, the transport network 1 and the transport network 2 may include an operator dedicated network, an Internet (Internet) public network, and the like.

The transport network 1 and the transport network 2 serve as bearer networks, so that an SD-WAN tunnel may be deployed between different site devices. An SD-WAN tunnel is a logical channel between two site devices. Data can be transmitted between the two site devices through the SD-WAN tunnel. Generally, a physical egress interface of the SD-WAN tunnel is a WAN interface on a site device. To be specific, egress interfaces at both ends of the SD-WAN tunnel are wide area network interfaces on the two site devices, and the wide area network interfaces on the two site devices can be interconnected through the bearer network.

(2) Bit Index Explicit Replication (Bit Index Explicit Replication, BIER)

BIER is a new multicast forwarding technology, in which a set of destination nodes for which a multicast packet are destined is encapsulated in the form of a bit string (Bit String, BS) in a packet header for sending, so that an intermediate node in a network do not need to sense a multicast service or maintain a multicast stream status. This technology resolves problems in the conventional multicast technology and provides good multicast service scalability.

In a BIER network, based on a bit index forwarding table (Bit Index Forwarding table, BIFT) created on a bit forwarding router (Bit Forwarding Router, BFR) through the BIER technology, the BFR only needs to replicate and forward a packet based on a bit string, to implement packet multicast.

Figure 2:
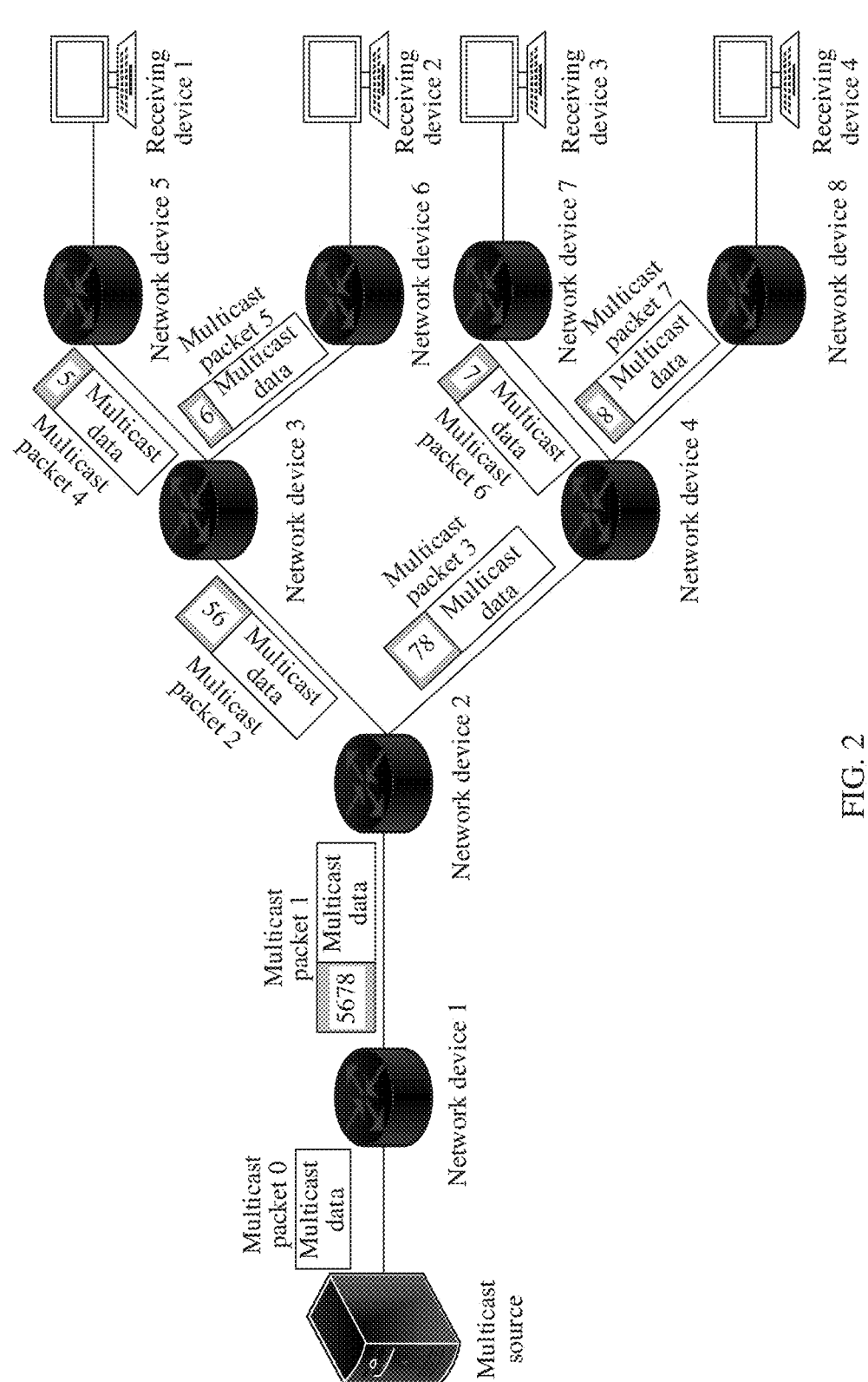
FIG. 2 is a schematic diagram of implementing data multicast in a BIER network according to an embodiment of this application.

For example, FIG. 2 is a schematic diagram of implementing data multicast in a BIER network according to an embodiment of this application. As shown in FIG. 2, the BIER network includes a network device 1 to a network device 8, and the network device 1 to the network device 8 all have a BIER capability. The network device 1 is connected to a multicast source and the network device 2. The network device 2 is further connected to the network device 3 and the network device 4. The network device 3 is further connected to the network device 5 and the network device 6. The network device 4 is further connected to the network device 7 and the network device 8. In addition, the network device 5 to the network device 8 are respectively connected to a receiving device 1 to a receiving device 4.

In the BIER network shown in FIG. 2, the multicast source needs to send multicast data to the receiving device 1 to the receiving device 4 through the BIER network. First, the multicast source sends a multicast packet 0 to the network device 1. The multicast packet 0 carries multicast data. The network device 1 obtains a BS corresponding to the multicast data by looking up a multicast forwarding table. The BS indicates a set of destination nodes of the multicast data, to be specific, the destination nodes of the multicast data are the network device 5 to the network device 8. Then, the network device 1 sends, to the network device 2, a multicast packet 1 in which the BS and the multicast data are encapsulated, to indicate that the destination nodes of the multicast data are the network device 5 to the network device 8.

After receiving the multicast packet 1, the network device 2 determines, based on the BS in the multicast packet 1, that next-hop devices are respectively the network device 3 and the network device 4. Therefore, the network device 2 sends a multicast packet 2 to the network device 3. The multicast packet 2 carries the multicast data, and a BS in the multicast packet 2 indicates that destination nodes of the multicast data are the network device 5 and the network device 6. In addition, the network device 2 further generates a multicast packet 3 by replicating the multicast data, and sends the multicast packet 3 to the network device 4. The multicast packet 3 carries multicast data, and the BS in the multicast packet 3 indicates that destination nodes of the multicast data are the network device 7 and the network device 8.

After receiving the multicast packet 2, the network device 3 determines, based on the BS in the multicast packet 2, that next-hop devices are respectively the network device 5 and the network device 6. Similar to a forwarding process of the network device 2, the network device 3 sends, to the network device 5, a multicast packet 4 indicating that a destination node is the network device 5, and sends, to the network device 6, a multicast packet 5 indicating that a destination node is the network device 6.

Similar to a forwarding process of the network device 3, after the network device 4 receives the multicast packet 3, the network device 4 sends, to the network device 7, a multicast packet 6 indicating that a destination node is the network device 7, and sends, to the network device 8, a multicast packet 7 indicating that a destination node is the network device 8.

Finally, the network device 5 to the network device 8 send the multicast data to the receiving device 1 to the receiving device 4 respectively based on the received multicast packets, to implement data multicast.

Figure 3:
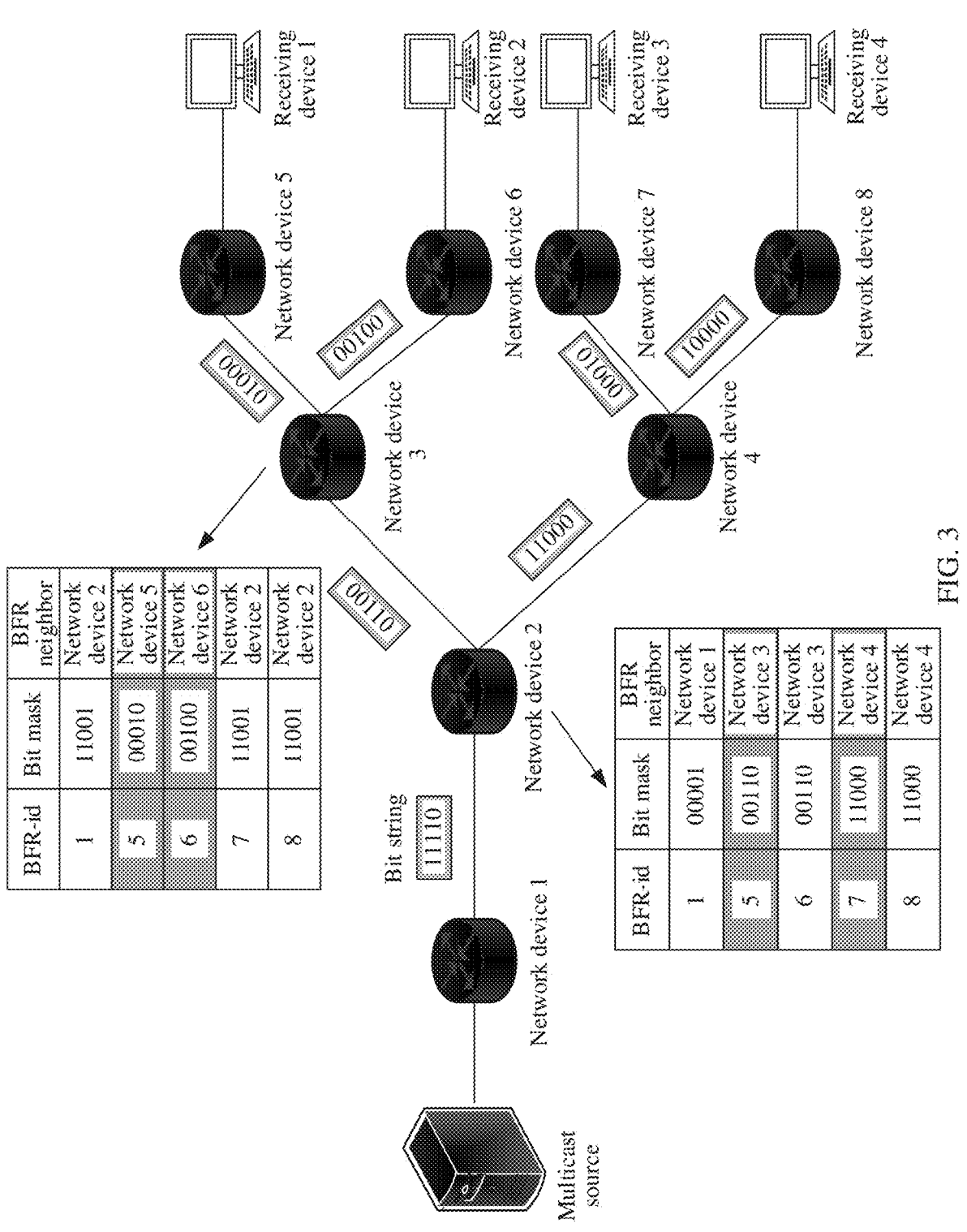
FIG. 3 is a schematic diagram of forwarding a multicast packet by looking up a BIER forwarding table in a BIER network according to an embodiment of this application.

FIG. 3 is a schematic diagram of forwarding a multicast packet by looking up a BIER forwarding table in a BIER network according to an embodiment of this application. As shown in FIG. 3, a BS represents different network devices using bits at different positions. When a bit on the BS is set to 1, it indicates that a network device corresponding to the bit belongs to a set of destination nodes of multicast data. In FIG. 3, the BS includes five bits, and in an order from right to left, the five bits in the BS respectively represent a network device 1, a network device 5, a network device 6, a network device 7, and a network device 8. For example, a BS whose value is 00001 represents that a destination node is the network device 1, and a BS whose value is 00110 represents that destination nodes are the network device 5 and the network device 6.

As shown in FIG. 3, a BIER forwarding table of the network device 2 includes a BIER forwarding router identifier (Bit-Forwarding Router Identity, BFR-id), a bit mask, and a BFR neighbor. The BFR-id indicates an identifier of a destination node, the bit mask indicates a mask corresponding to the destination node, and the BFR neighbor indicates a next-hop neighbor of a multicast packet whose destination address is the destination node. When the network device 2 receives a BS whose value is 11110, the network device 2 performs a bitwise AND operation on the received BS and the bit mask in the BIER forwarding table. After a bitwise AND operation is performed on the BS whose value is 11110 and bit masks in the $2^{nd}$ forwarding table entry and the $4^{th}$ forwarding table entry in the BIER forwarding table, a bitwise AND result whose value is not all 0s can be obtained. Therefore, the network device 2 sends, based on a result obtained by performing the bitwise AND operation, a BS whose value is 00110 (that is, a bitwise AND result of the BS whose value is 11110 and a bit mask 00110) to the network device 3 indicated by the $2^{nd}$ forwarding table entry, and sends a BS whose value is 11000 (that is, a bitwise AND result of the BS whose value is 11110 and a bit mask 11000) to the network device 4 indicated by the $4^{th}$ forwarding table entry.

Similarly, after the network device 3 receives the BS whose value is 00110, the network device 3 performs a bitwise AND operation on the BS and the bit mask in the BIER forwarding table. In the network device 3, after a bitwise AND operation is performed on the BS whose value is 00110 and bit masks in the $2^{nd}$ forwarding table entry and the $3^{rd}$ forwarding table entry in the BIER forwarding table, a bitwise AND result whose value is not all 0s can be obtained. Therefore, the network device 3 sends, based on a result obtained by performing the bitwise AND operation, a BS whose value is 00010 (that is, a bitwise AND result of the BS whose value is 00110 and a bit mask 00010) to the network device 5 indicated by the $2^{nd}$ forwarding table entry, and sends a BS whose value is 00100 (that is, a bitwise AND result of the BS whose value is 00110 and a bit mask 00100) to the network device 4 indicated by the $4^{th}$ forwarding table entry.

Currently, a manner of implementing a multicast service in the SD-WAN is to deploy the PIM protocol on all CPEs, and establish a PIM multicast distribution tree for each multicast stream on a network through the CPEs. With large-scale deployment of a multicast service, a quantity of to-be-maintained multicast distribution trees increases sharply, and all node devices on the multicast distribution trees need to store a large quantity of multicast stream states, to be specific, there are a large quantity of multicast table entries on the node devices. Consequently, the multicast table entries on the node device converge slowly when the network changes, and normal running of the multicast service is affected.

In view of this, embodiments of this application provide a multicast communication method. A BIER capability is deployed on site devices in an SD-WAN, a BIER header in a multicast packet indicates a destination node of a multicast packet, and no multicast distribution tree needs to be constructed. In addition, the multicast packet is forwarded through an SD-WAN tunnel between site devices, and an intermediate node does not need to sense a multicast service, to reduce a quantity of multicast table entries on a network device and accelerate convergence of the multicast table entries, so that normal running of the multicast service is ensured.

Specifically, the multicast communication method provided in embodiments of this application may be applied to the SD-WAN network shown in FIG. 1, and is for implementing a multicast service in the SD-WAN network.

To facilitate understanding of the multicast communication method provided in embodiments of this application, the following first describes a process of deploying an SD-WAN tunnel between site devices in an SD-WAN network and deploying a BIER forwarding table on the site devices.

Figure 4:
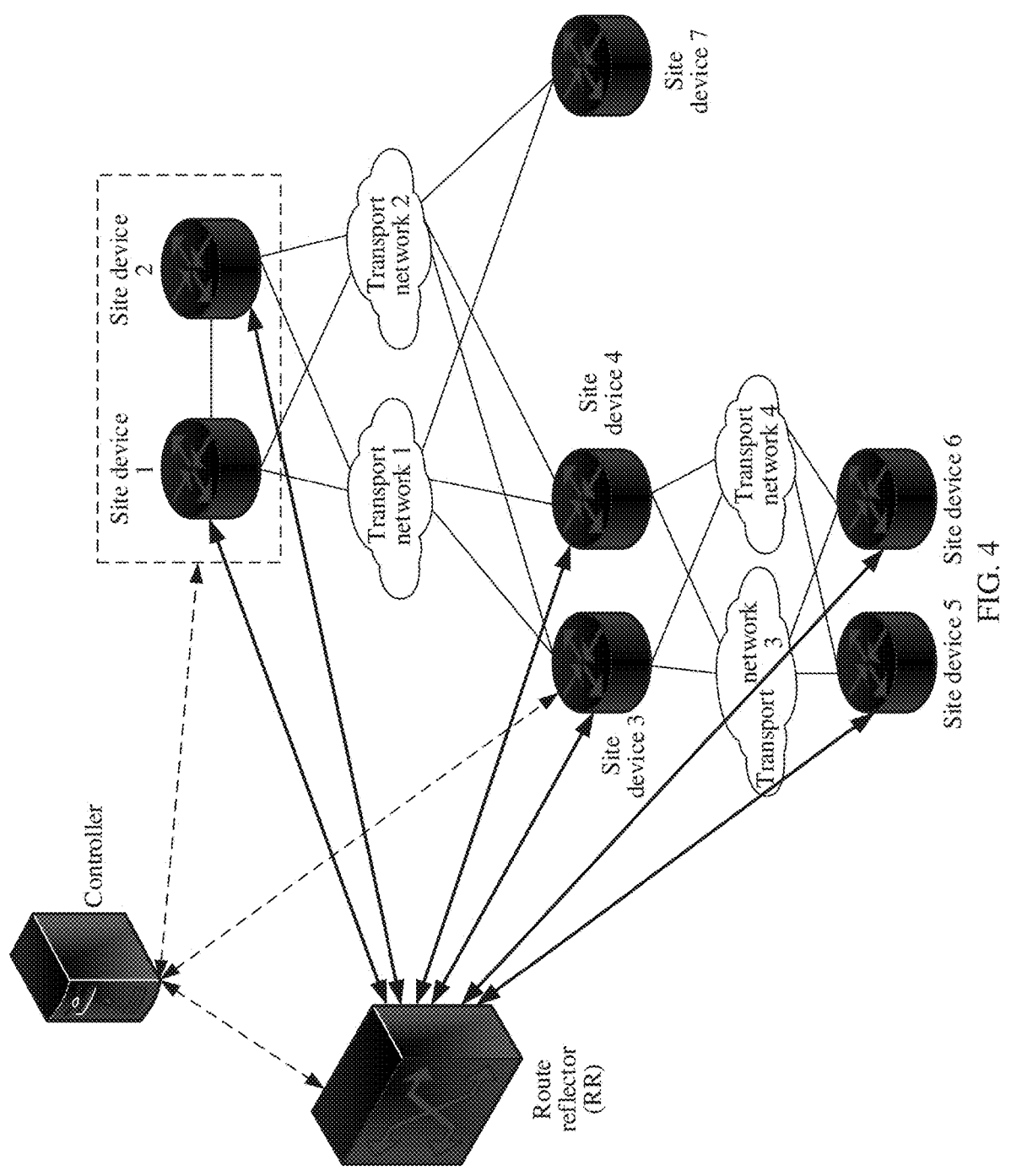
FIG. 4 is a schematic diagram of an SD-WAN network according to an embodiment of this application.

FIG. 4 is a schematic diagram of an SD-WAN network according to an embodiment of this application. As shown in FIG. 4, the SD-WAN network includes a site device 1 to a site device 7, a route reflector (Route Reflector, RR), and a controller. All the site device 1 to the site device 4 are connected to a transport network 1 and a transport network 2, to be specific, the site device 1 to the site device 4 may be interconnected through the transport network 1 and the transport network 2. In addition, all the site device 3 to the site device 6 are connected to a transport network 3 and a transport network 4, to be specific, the site device 3 to the site device 6 can be interconnected through the transport network 3 and the transport network 4. The site device 1 to the site device 6 are further connected to the RR, and are configured to implement advertisement of information between the site devices through the RR.

In addition, the controller is connected to the RR and the site devices in the SD-WAN network (to avoid complex lines in the accompanying drawings, FIG. 4 shows only connections between the controller and the RR, the site device 1, and the site device 3).

For example, in FIG. 4, the SD-WAN network includes three types of channels: a management channel, a control channel, and a data channel. Specifically, detailed information about the three channels in the SD-WAN network is shown in Table 1.

TABLE 1

| Channel type | Channel connection type | Channel position | Channel function |
|---|---|---|---|
| Management channel | NETCONF connection | Between a controller and a site device/an RR | A controller delivers a configuration to a site device/an RR. |
| | DTLS connection | Between an RR and a site device | Exchange TNP information between a site device and an RR |
| Control channel | BGP connection | Between an RR and a site device | An RR reflects TNP information of a site device. |
| Data channel | SD-WAN tunnel | Between site devices | Forward a data packet |

1. Network-Configuration Protocol (Network Configuration Protocol, NETCONF) Management Channel A NETCONF management channel is a connection channel between the controller and a network device such as the site device and the RR. The controller can deliver a configuration, for example, a configuration such as a basic network configuration, a VPN service parameter, a route selection policy, to the network device, such as the site device and the RR, through the NETCONF management channel. The basic network configuration includes system IP (System IP) addresses of the site device and the RR. In addition, when there are a plurality of RRs in the SD-WAN network, the controller can further allocate, to the site devices, RRs to which the site devices belong.

Network devices, such as the site devices and the RRs, can report network operation and maintenance information, for example, performance collection information such as alarm formation of devices, device logs, and network traffic, to the controller through NETCONF management channels.

2. Datagram Transport Layer Security (Datagram Transport Layer Security, DTLS) Management Channel A DTLS management channel is configured to exchange transport network point (Transport network point, TNP) information between the RR and the site device. The TNP information may include information such as an IP address of a port of the network device, an identifier of an operator network connected to the port of the network device, an identifier of a dedicated network connected to the network device, and an identifier of a site in which the site device is located. In general, the TNP information can indicate information about a transport network to which the RR/site device is connected and information about a port on the RR/site device for connecting to the transport network.

Based on the DTLS management channel, the RR can advertise its TNP information to the site device, and the site device can also advertise its TNP information to the RR.

3. Border Gateway Protocol (Border Gateway Protocol, BGP) Control Channel

After the RR exchanges TNP information with the site devices, the RR and the site devices establish BGP control channels between the RR and the site devices based on the TNP information learned from each other. After a BGP control channel is established between the RR and a site device, the site device advertises TNP information to the RR, so that the RR reflects the TNP information to another site device.

4. Data Channel

When a site device receives TNP information of another site device reflected by the RR, an SD-WAN tunnel to a peer site device is established between the site devices based on the received TNP information, so that a data packet is subsequently transmitted through the SD-WAN tunnel.

In addition, in the SD-WAN network, when a site device receives routing information advertised by another network device, the site device may advertise the routing information to another site device through the RR, so that each site device can generate a forwarding table for guiding packet forwarding, and a forwarding path indicated in the forwarding table is related to an SD-WAN tunnel between site devices.

Figure 5:
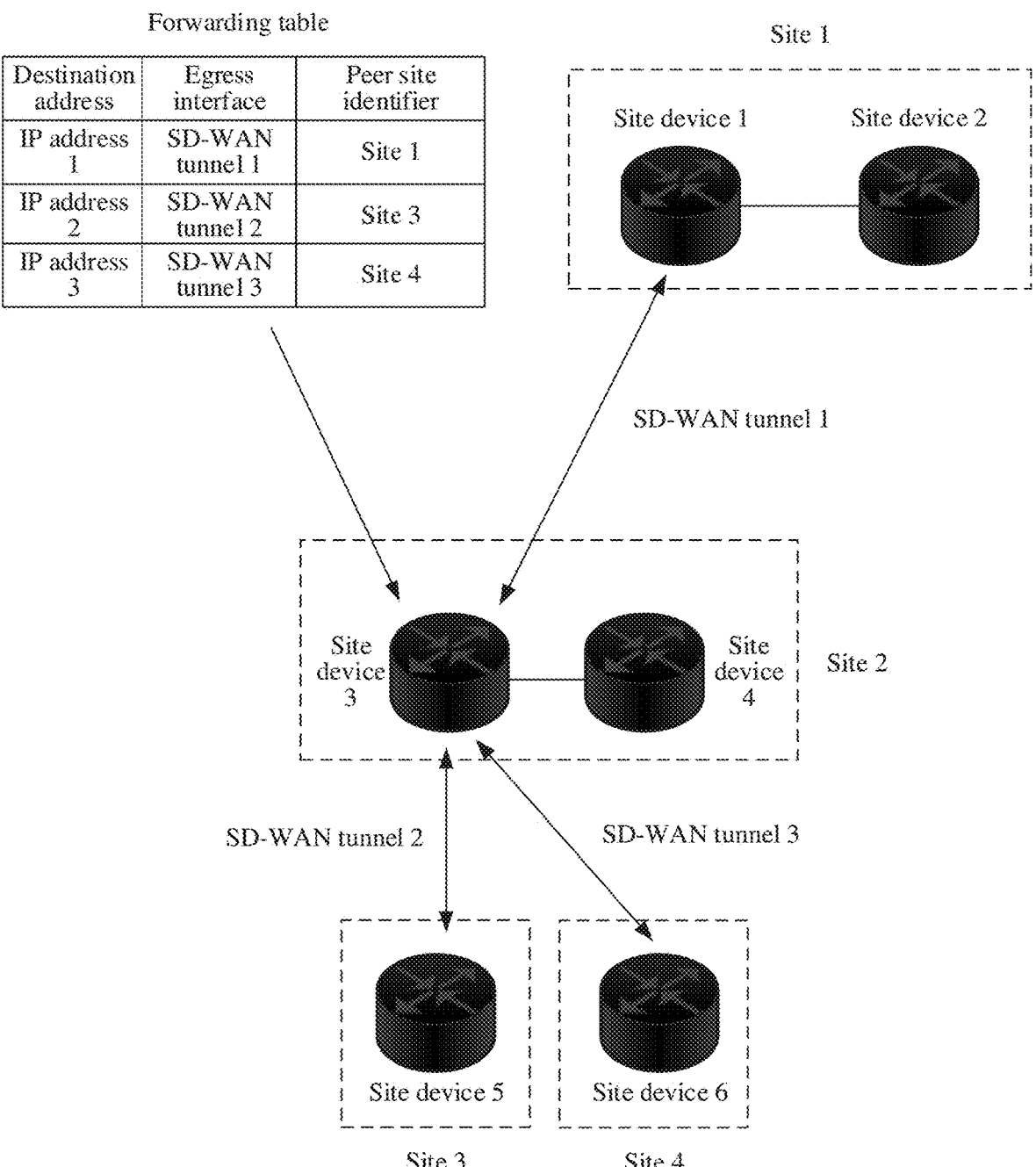
FIG. 5 is a schematic diagram of generating a forwarding table by a site device in an SD-WAN network according to an embodiment of this application.

For example, FIG. 5 is a schematic diagram of generating a forwarding table by a site device in an SD-WAN network according to an embodiment of this application. As shown in FIG. 5, a site device 1 and a site device 2 are located at a site 1, a site device 3 and a site device 4 are located at a site 2, a site device 5 is located at a site 3, and a site device 6 is located at a site 4.

After the site device 1, the site device 5, and the site device 6 advertise TNP information and routing information to the site device 3 via an RR, a forwarding table can be generated on the site device 3. The TNP information may include a site identifier of a site in which a site device is located and related information required for establishing an SD-WAN tunnel. For example, the TNP information includes a site to which a site device belongs and an IP address of the site device. Therefore, the site device 3 can generate a mapping relationship between the SD-WAN tunnel and a peer site of the SD-WAN tunnel based on the received TNP information.

As shown in FIG. 5, a forwarding table records a mapping relationship between a destination address, an egress interface, and a peer site identifier. For example, in the $1^{st}$ forwarding table entry of the forwarding table, a destination address is an IP address 1, and the IP address 1 is an IP address of the site device 1 or an IP address in the routing information sent by the site device 1 to the site device 3. An egress interface corresponding to the IP address 1 points to an SD-WAN tunnel 1, to be specific, an SD-WAN tunnel between the site device 3 and the site device 1. A peer site identifier is the site 1, to be specific, a peer site of the SD-WAN tunnel 1 is the site 1.

In the $2^{nd}$ forwarding table entry of the forwarding table, a destination address is an IP address 2, and the IP address 2 is an IP address of the site device 5 or an IP address in the routing information sent by the site device 5 to the site device 3. An egress interface corresponding to the IP address 2 points to an SD-WAN tunnel 2, that is, an SD-WAN tunnel between the site device 3 and the site device 5. A peer site identifier is the site 3, to be specific, a peer site of the SD-WAN tunnel 2 is the site 3.

Similarly, in the $3^{rd}$ forwarding table entry of the forwarding table, a destination address is an IP address 3, and the IP address 3 is an IP address of the site device 6 or an IP address in the routing information sent by the site device 6 to the site device 3. An egress interface corresponding to the IP address 3 points to an SD-WAN tunnel 3, to be specific, an SD-WAN tunnel between the site device 3 and the site device 6. A peer site identifier is the site 4, to be specific, a peer site of the SD-WAN tunnel 3 is the site 4.

It can be learned from FIG. 5 that an SD-WAN tunnel-related forwarding table records a mapping relationship between an SD-WAN tunnel and a peer site identifier of the SD-WAN tunnel when an egress interface points to the SD-WAN tunnel.

Optionally, in some embodiments, a mapping relationship between an SD-WAN tunnel and a peer site identifier of the SD-WAN tunnel may alternatively be directly recorded on a site device, for example, a mapping table for recording a mapping relationship between an SD-WAN tunnel and a peer site identifier of the SD-WAN tunnel is generated.

In conclusion, when a site device establishes a mapping relationship between an SD-WAN tunnel and a peer site identifier of the SD-WAN tunnel, when a next-hop site identifier is determined, the site device can determine, based on the mapping relationship, that an egress interface points to an SD-WAN tunnel corresponding to the next-hop site identifier.

In a process in which the site device generates the BIER forwarding table, the site device advertises BIER information to another site device via an RR. The BIER information includes, for example, a BFR-ID of the site device and a BIER forwarding router advertisement prefix (BFR-Prefix) of the site device.

After the site device receives BIER information advertised by the another site device, the site device can generate a BIER forwarding table based on the received BIER information and a topology of the SD-WAN. The BIER forwarding table records a mapping relationship between a BFR-ID and a next-hop site.

In addition, the site device may obtain the topology of the SD-WAN by receiving SD-WAN tunnel information advertised by the another site device. Specifically, for site devices in the SD-WAN, each site device advertises, to another site device, information about an SD-WAN tunnel established between the site device and the another site device. Therefore, after any site device receives SD-WAN tunnel information advertised by other site devices, the site device can obtain tunnel connection relationships between the site devices in the SD-WAN, to be specific, obtain the topology of the entire SD-WAN. The topology of the SD-WAN describes connection relationships of SD-WAN tunnels established between site devices in the SD-WAN. In this way, when using another site device as a destination address, a site device can calculate, based on the topology of the SD-WAN, a next-hop site of the another site device.

For example, it is assumed that the SD-WAN includes a site device A to a site device E, and the site device A receives SD-WAN tunnel information advertised by the site device B to the site device E. The SD-WAN tunnel information advertised by the site device B is: The site device B establishes SD-WAN tunnels with the site device A and the site device C. The SD-WAN tunnel information advertised by the site device C is: The site device C establishes an SD-WAN tunnel with the site device B. The SD-WAN tunnel information advertised by the site device D is: The site device D establishes SD-WAN tunnels with the site device A and the site device E. The SD-WAN tunnel information advertised by the site device E is: The site device E establishes SD-WAN tunnels with the site device D and the site device C.

In this case, the site device A may obtain the topology of the SD-WAN based on the SD-WAN tunnel information advertised by the site device B to the site device E. Specifically, the topology of the SD-WAN is as follows: The site device A establishes SD-WAN tunnels with the site device B and the site device D, the site device B further establishes an SD-WAN tunnel with the site device C, the site device C further establishes a tunnel with the site device E, and the site device D further establishes an SD-WAN tunnel with the site device E. That is, the topology of the SD-WAN may describe connection relationships of SD-WAN tunnels of each site device as: [A-B-C] and [A-D-E-C].

For example, when the site device A uses the site device C as a destination address, the site device A may calculate, on the topology of the SD-WAN through the shortest path algorithm, that a next-hop site toward the site device C is the site device B.

Figure 6:
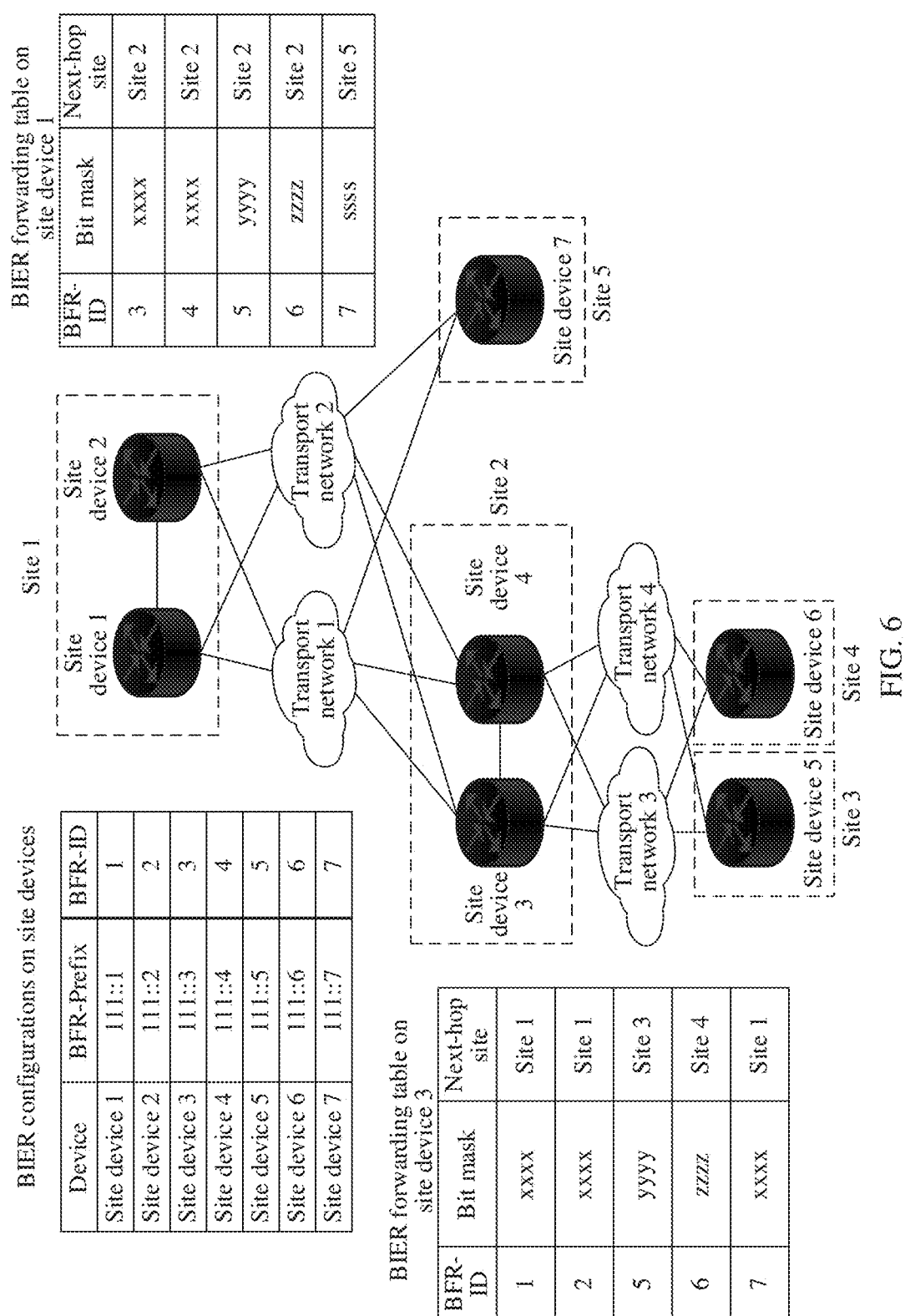
FIG. 6 is a schematic diagram of generating a BIER forwarding table by a site device in an SD-WAN network according to an embodiment of this application.

For example, FIG. 6 is a schematic diagram of generating a BIER forwarding table by a site device in an SD-WAN network according to an embodiment of this application. As shown in FIG. 6, in an SD-WAN network, a unique BFR-prefix and a unique BFR-ID are configured for each site device.

In FIG. 6, each site device advertises its BIER information to another site device via an RR. The BIER information may include a BFR-prefix and a BFR-ID of the site device. Each site device can generate a corresponding BIER forwarding table based on BIER information obtained from another site device.

As shown in FIG. 6, for a site device 1, the site device 1 generates a BIER forwarding table on the site device 1 based on BIER information obtained from a site device 2 to a site device 7. The BIER forwarding table on the site device 1 records a mapping relationship among the BFR-ID of the site device, a next-hop End-BIER, and a next-hop site. For example, in the BIER forwarding table, in the $1^{st}$ forwarding table entry, a BFR-ID is 3, and a next-hop site is a site 2. To be specific, in the site device 1, for a packet destined for the site device 3 whose BFR-ID is 3, a next-hop site is the site 2. For another example, in the BIER forwarding table, in the $3^{rd}$ forwarding table entry, a BFR-ID is 5, and a next-hop site is a site 2. That is, in the site device 1, for a packet destined for the site device 5 whose BFR-ID is 5, a next-hop site is the site 2. To be specific, the site device 1 sends, to the site device 3, a packet destined for the site device 5, so that site device 3 continues to forward the packet to the site device 5.

Similarly, for the site device 3, the site device 3 generates a BIER forwarding table on the site device 3 based on BIER information obtained from the site devices 1, 2, and 4 to 7. The BIER forwarding table on the site device 3 also records a mapping relationship among the BFR-ID of the site device, a next-hop End-BIER, and a next-hop site.

Optionally, the BIER forwarding table generated by the site device may further include a bit mask for performing a bitwise AND operation on the bit mask and the BS, to be specific, a same BIER forwarding table entry includes a mapping relationship among a BFR-ID, a bit mask, and a next-hop site.

It can be learned from FIG. 5 and FIG. 6 that when the site device determines a next-hop site based on the BIER forwarding table shown in FIG. 6, the site device can determine, based on a mapping relationship between a site identifier and an SD-WAN tunnel shown in FIG. 5, an SD-WAN tunnel for performing packet forwarding, so that BIER multicast forwarding can be implemented through the SD-WAN tunnel.

The foregoing describes a process in which a site device generates a BIER forwarding table based on BIER information advertised by another site device. It should be understood that in this embodiment, BIER information is advertised only between site devices in the SD-WAN network, but not between all network devices in the network. Therefore, in this embodiment, an existing protocol packet is extended, so that BIER information is advertised only between site devices in the SD-WAN network.

Specifically, the site device may advertise a BGP packet to another site device. BIER information is carried in the BGP packet. The BGP packet may, for example, include a BGP shortest path first (shortest path first, SPF) address family packet, a BOP link state (link state, LS) address family packet, or a BGP SD-WAN address family packet.

In a possible implementation, the BIER information is carried by extending a prefix network layer reachability information (Prefix Network Layer Reachability Information, Prefix NLRI) field in a BGP SPF address family packet or a BOP LS address family packet.

Figure 7:
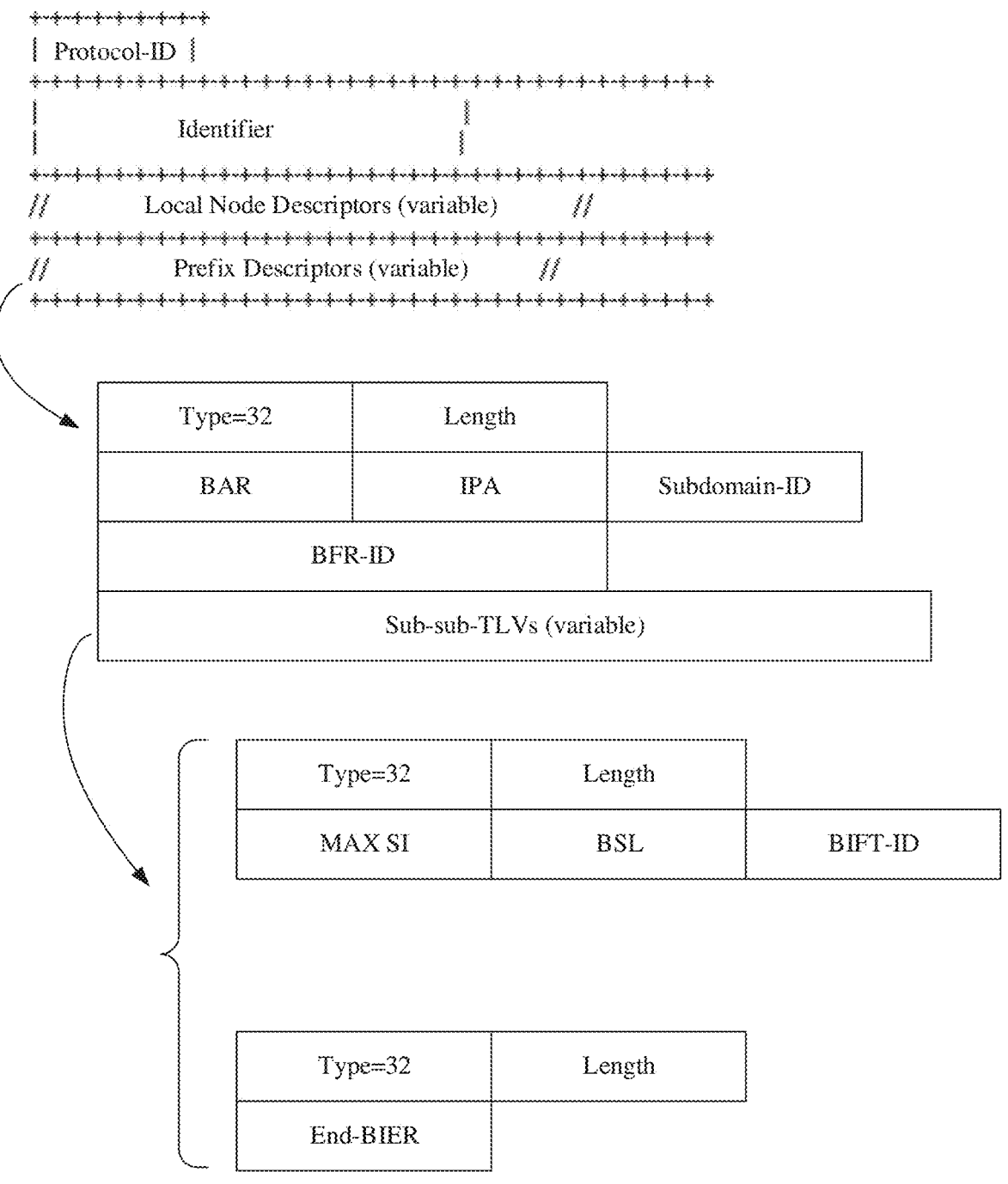
FIG. 7 is a schematic diagram of including BIER information in a BGP SPF address family packet in an extended manner according to an embodiment of this application.

For example, FIG. 7 is a schematic diagram of including BIER information in a BGP SPF address family packet in an extended manner according to an embodiment of this application. As shown in FIG. 7, a BGP SPF address family packet includes the following fields: protocol-ID (Protocol-ID), identifier (Identifier), local node descriptors (Local Node Descriptors), and prefix descriptors (Prefix Descriptors). The local node descriptors is a type-length-value (type-length-value, TLV) field, and the local node descriptors field is the foregoing prefix NLRI. A sub-TLV (Sub-TLV) is obtained by extending the local node descriptors field. A type of the sub-TLV is 32, and BIER information carried in the sub-TLV includes a subdomain identifier (Subdomain-ID) and a BFR-ID. In addition, two sub-sub-TLVs may be further extended in the sub-TLV. BIER information carried in the $1^{st}$ sub-sub-TLV includes: a maximum set identifier (Maximum Set Identifier, MAX SI), a bit string length (Bit String Length, BSL), and a BIER forwarding table identifier (BIER index forwarding table identifier, BIFT-ID). The MAX SI indicates a maximum length of a BS, and the BSL indicates a length of a bit string in BIER encapsulation. BIER information carried in the $2^{nd}$ sub-sub-TLV includes an End-BIER.

It may be understood that FIG. 7 shows a specific manner of extending the TLV, local node descriptors fields, to carry BIER information. In actual applications, the BIER information may also be carried by extending other TLVs in a BGP SPF address family packet or a BGP LS address family packet, which is not specifically limited in this embodiment.

In another possible implementation, the BIER information is carried by extending an SD-WAN NLRI attribute field in the BGP SD-WAN address family packet.

The foregoing describes a specific manner of carrying the BIER information by extending an existing BGP address family packet. In actual applications, the BIER information may alternatively be carried by another protocol packet, which is not specifically limited in this embodiment. In addition, in addition to extending an existing protocol packet to carry the BIER information, a new protocol packet may be added to carry the BIER information, for example, a new BGP address family packet is added to carry the BIER information.

The foregoing describes a process in which the BIER information is carried by extending a protocol packet, so that the BIER information is advertised between site devices, to help the site devices to generate a BIER forwarding table. After the site device generates a mapping relationship between the SD-WAN and a site identifier and generates the BIER forwarding table, the site device can forward a BIER packet based on an SD-WAN tunnel.

However, for a site device (for example, a site device connected to a multicast source or a site device serving as a multicast source) that first obtains multicast data, the site device needs to generate a BS based on a multicast group of the multicast data, to indicate another site device to forward the multicast data. The multicast group refers to destination addresses of the multicast data. A network device that needs to receive the multicast data needs to join the multicast group in advance. In other words, the site device that first obtains the multicast data needs to learn of multicast group information in the SD-WAN network, to generate, when obtaining the multicast data, a corresponding BS based on the multicast group corresponding to the multicast data.

In this embodiment, when the site device receives multicast group join request information sent by a receiving device of the multicast data, the site device advertises, to another site device via a BGP multicast VPN (Multicast VPN, MVPN) address family packet, information indicating that the receiving device joins the multicast group, so that the another site device can generate corresponding multicast group information.

For example, using the site device 5 in FIG. 6 as an example, the site device 5 is further connected to a receiving device. The receiving device sends multicast group join request information to the site device 5, to indicate that the receiving device to request to join a specific multicast group. For example, the multicast group join request information includes (*, G) join information or (S, G) join information. Key information of the (*, G) join information is (RD, Source AS, RP, G, Originating IP), where RD refers to a routing domain (Routing Domain) of the receiving device, Source AS refers to a source autonomous system (Source Autonomous System), RP refers to a rendezvous point (rendezvous point), G refers to the multicast group, and Originating IP refers to a source IP address of an access device. Key information of the (S, G) join information is (RD, Source AS, S, G, Originating IP), where S refers to a multicast source. After obtaining the multicast group join request information sent by the receiving device, the site device 5 may advertise, to another site device (for example, the site devices 1 to 4) through the RR, of information indicating that the receiving device joins the multicast. The information indicating that the receiving device joins the multicast may refer to the (*, G) join information or the (S, G) join information. After receiving the information that is advertised by the site device 5 and that indicates that the receiving device joins the multicast, the another site device can determine a multicast group that the receiving device joins, and then determine a set of destination nodes of the multicast packet based on the multicast group.

The foregoing describes deployment processes, such as establishing an SD-WAN tunnel, generating a BIER forwarding table, and generating multicast group information, on a site device in the SD-WAN network. The following describes how a site device in the SD-WAN network implements BIER multicast based on the foregoing deployment.

Figure 8:
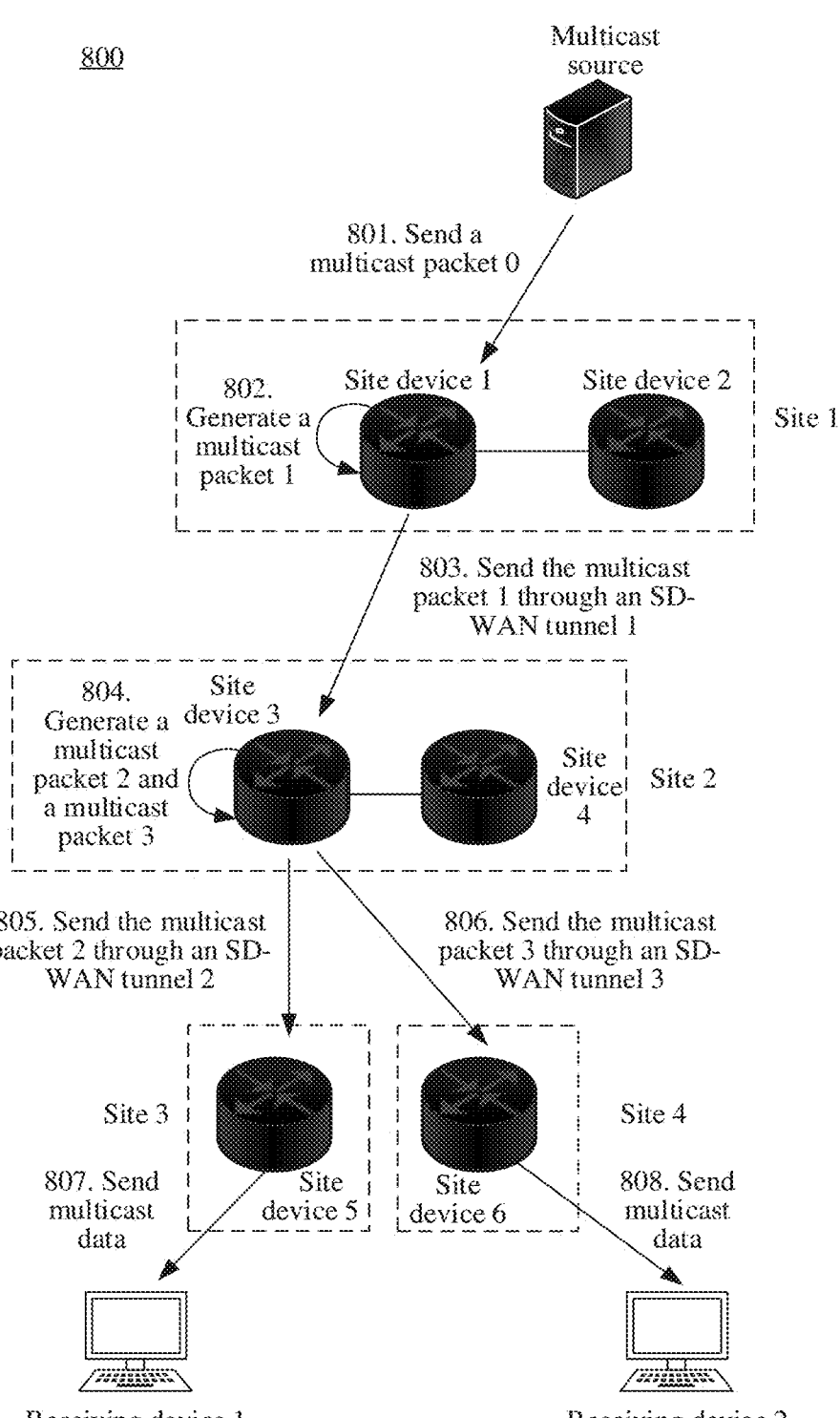
FIG. 8 is a schematic flowchart of a multicast communication method 800 according to an embodiment of this application.

FIG. 8 is a schematic flowchart of a multicast communication method 800 according to an embodiment of this application. As shown in FIG. 8, the multicast communication method 800 includes the following steps 801 to 808.

Step 801: A multicast source sends a multicast packet 0 to a site device 1.

In this embodiment, the multicast source is a sender of multicast data, and is responsible for sending the multicast data to devices that joins a multicast group. The multicast packet 0 includes multicast data, and the multicast packet 0 further indicate a multicast group corresponding to the multicast data.

Step 802: The site device 1 generates a multicast packet 1 based on the multicast packet 0.

Because the multicast packet 0 indicates the multicast group corresponding to the multicast data, the site device 1 may determine, by querying a multicast forwarding table, a BIER forwarding table and a bit string based on the multicast group corresponding to the multicast data. The site device 1 performs a bitwise AND operation on the bit string and a bit mask in the BIER forwarding table, to determine that a next-hop site of the multicast data is a site device 3. Then, based on that the next-hop site is a site 3, the site device 1 determines, by querying a mapping relationship between the next-hop site and an SD-WAN tunnel, an SD-WAN tunnel 1 for forwarding the multicast data. Then, the site device 1 encapsulates a first BIER header into an outer layer of the multicast data. The first BIER header includes a bit string. The bit string indicates a set of destination nodes of the multicast data. In addition, the site device 1 further encapsulates an SD-WAN tunnel encapsulation header into an outer layer of the first BIER header based on the information about the SD-WAN tunnel 1, to obtain the multicast packet 1.

Step 803: The site device 1 sends the multicast packet 1 to a site device 3 through the SD-WAN tunnel 1.

The site device 1 and the site device 3 are two endpoints of the SD-WAN tunnel 1.

Step 804: The site device 3 generates a multicast packet 2 and a multicast packet 3 based on the multicast packet 1.

After the multicast packet 1 is received through the SD-WAN tunnel 1, because the site device 3 is an endpoint of the SD-WAN tunnel 1, the site device 3 decapsulates the SD-WAN tunnel encapsulation header in the multicast packet 1, to obtain the first BIER header and the multicast data.

Figure 9:
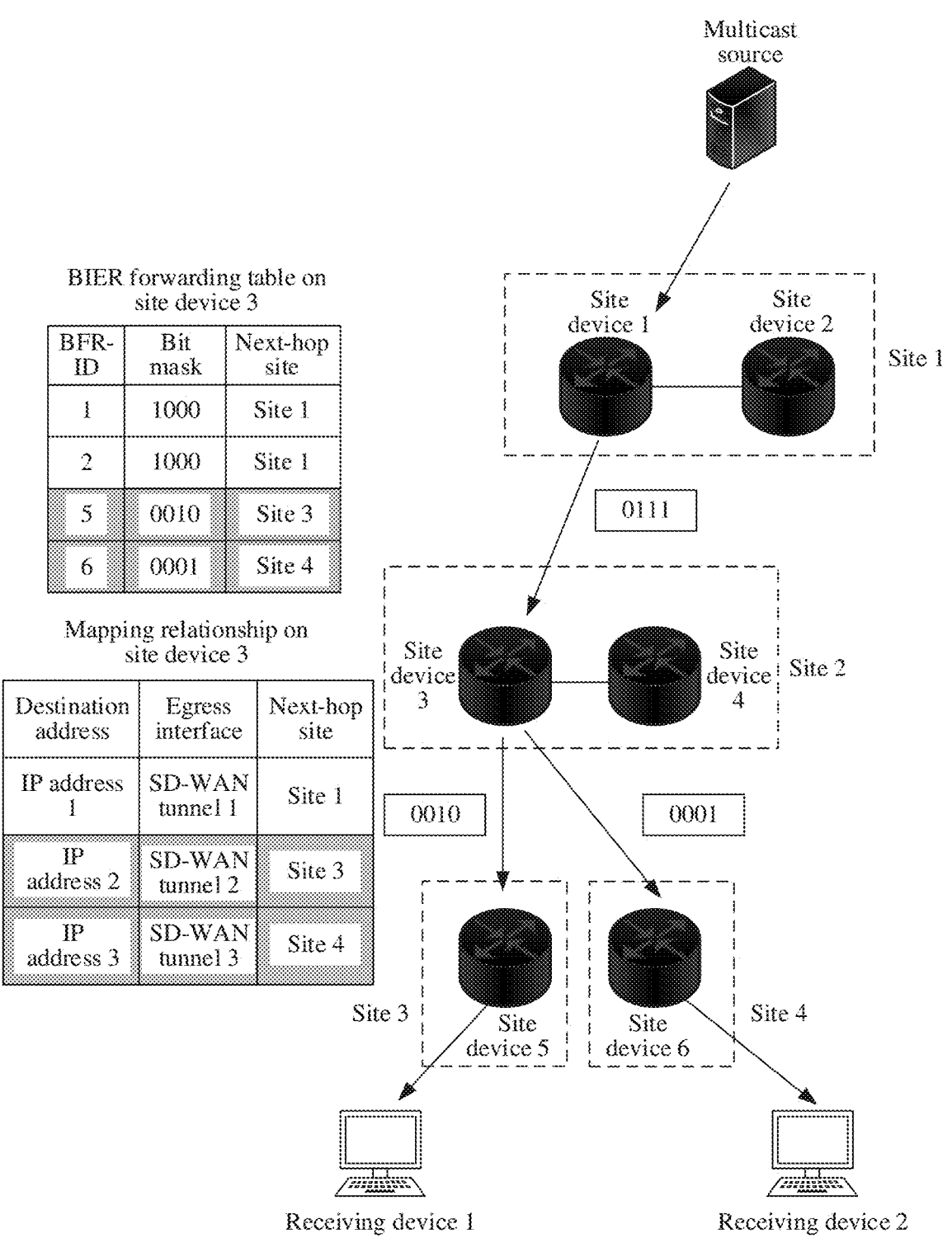
FIG. 9 is a schematic diagram of determining a next-hop site based on a bit string and a BIER forwarding table according to an embodiment of this application.

Then, the site device 3 determines, based on the bit string in the first BIER header and a BIER forwarding table on the site device 3, that next-hop sites are the site 3 and a site 4. For example, FIG. 9 is a schematic diagram of determining a next-hop site based on a bit string and a BIER forwarding table according to an embodiment of this application. As shown in FIG. 9, a bit string in a first BIER header of a multicast packet 1 sent by a site device 1 to a site device 3 is 0111. Bits in the bit string respectively indicate a site 1, a site 2, a site 3, and a site 4 from left to right. Therefore, the bit string whose value is 0111 in the first BIER header indicates that a set of destination nodes of the multicast data is the site 2, the site 3, and the site 4. The site device 3 performs a bitwise AND operation on the bit string whose value is 0111 and a bit mask in the BIER forwarding table, and determines that forwarding table entries whose bit masks are 0010 and 0001 respectively match the bit string. Therefore, it is determined that next-hop sites are the site 3 and the site 4.

Further, based on that the next-hop sites that are the site 3 and the site 4, the site device 3 determines, based on a mapping relationship on the site device 3, that an egress interface points to the SD-WAN tunnel 1 when the next-hop site is the site 3, and determines that an egress interface points to an SD-WAN tunnel 3 when the next-hop site is the site 4.

Optionally, when the site device 3 determines, based on a mapping relationship between a next-hop site and an SD-WAN tunnel, the SD-WAN tunnel corresponding to the next-hop site, a same next-hop site may correspond to one or more SD-WAN tunnels, and the site device 3 may select one SD-WAN tunnel from a plurality of SD-WAN tunnels to forward a packet. For example, when the site device 3 determines, based on that the next-hop site is the site 1, an SD-WAN tunnel corresponding to the next-hop site, the site device 3 may determine that the SD-WAN tunnel includes an SD-WAN tunnel between the site device 3 and the site device 1 and an SD-WAN tunnel between the site device 3 and the site device 2. Therefore, the site device 3 may select one of the SD-WAN tunnels as a packet forwarding path. Specifically, the site device 3 may select, based on a preset load balancing policy or link quality of a tunnel, an SD-WAN tunnel for forwarding a packet. This is not specifically limited in this embodiment.

Based on information obtained by looking up the BIER forwarding table and the mapping relationship, the site device 3 performs packet header encapsulation on the multicast data, to obtain the multicast packet 2 and the multicast packet 3. Specifically, the site device 3 first encapsulates a second BIER header into the outer layer of the multicast data. A format of the second BIER header is the same as a format of the first BIER header. Then, the site device 3 further encapsulates the first SD-WAN tunnel encapsulation header into the outer layer of the second BIER header, to obtain the multicast packet 2. A destination address of the first SD-WAN tunnel encapsulation header is a destination address of a peer device of the SD-WAN tunnel 1 (that is, a destination address of the site device 5: an IP address 2). In other words, the multicast packet 2 includes the first SD-WAN tunnel encapsulation header, the second BIER header, and the multicast data.

Similarly, the site device 3 replicates the multicast data, and encapsulates a third BIER header into the outer layer of the multicast data obtained through replication. A format of the third BIER header is the same as a format of the first BIER header. Then, the site device 3 encapsulates a second SD-WAN tunnel encapsulation header into an outer layer of the third BIER header, to obtain the multicast packet 3. A destination address of the second SD-WAN tunnel encapsulation header is a destination address of a peer device of the SD-WAN tunnel 2 (that is, a destination address of the site device 6: an IP address 3). In other words, the multicast packet 3 includes the second SD-WAN tunnel encapsulation header, the third BIER header, and the multicast data.

Figure 10:
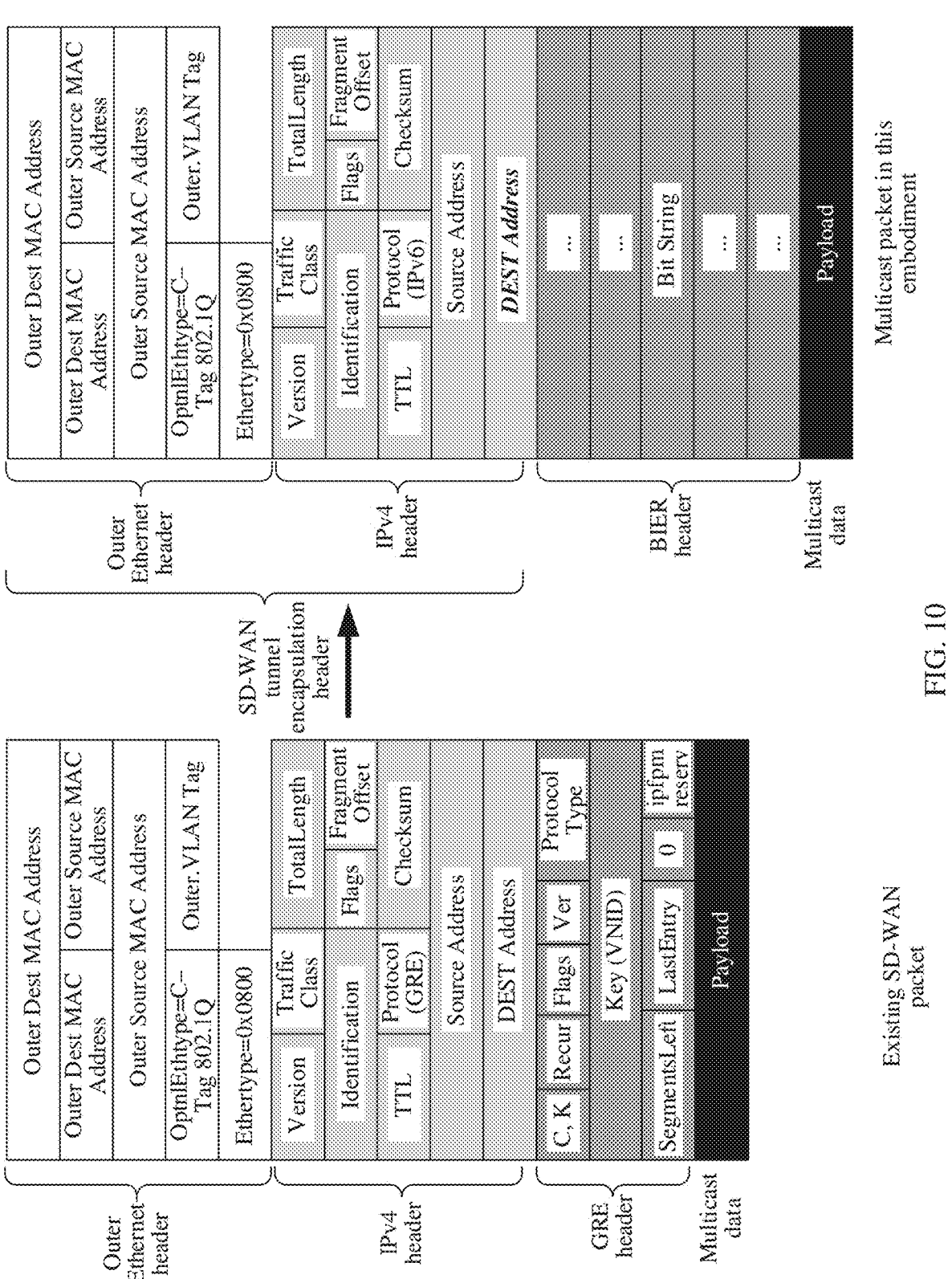
FIG. 10 is a schematic diagram of a format of a multicast packet according to an embodiment of this application.

For example, FIG. 10 is a schematic diagram of a format of a multicast packet according to an embodiment of this application. As shown in FIG. 10, in this embodiment, an SD-WAN tunnel-based multicast packet is obtained by extending an existing SD-WAN packet. The existing SD-WAN packet includes an outer Ethernet header, an IPv4 header, a generic routing encapsulation (Generic Routing Encapsulation, GRE) header, and multicast data. In this embodiment, the multicast packet (for example, the multicast packet 2 and the multicast packet 3) generated by the site device includes an outer Ethernet header, an IPv4 header, a GRE header, a BIER header, and multicast data. The outer Ethernet header and the IPv4 header form an SD-WAN tunnel encapsulation header. In addition, a protocol (Protocol) field in the IPv4 header indicates that a next header is the GRE header, and a protocol type (Protocol Type) field in the GRE header indicates that a next header is the BIER header.

In an SD-WAN tunnel encapsulation header of a multicast packet, a destination address (DEST Address) in the IPv4 header is an IP address of a peer site device of an SD-WAN tunnel, to be specific, an egress address of the SD-WAN tunnel. For example, in the multicast packet 2, a destination address of the first SD-WAN tunnel encapsulation header is a destination address of a peer device (the site device 5) of the SD-WAN tunnel 1.

FIG. 11 is a schematic diagram of a format of a BIER header according to an embodiment of this application. As shown in FIG. 11, a BIER header of a multicast packet includes the following key fields.

BIFT-id: identifies a BIER forwarding table.

Traffic class (Traffic Class, TC): indicates quality of service (QoS) of communication.

S: label stack bottom identifier.

Time to live (Time To Live, TTL): indicates a quantity of hops that a packet is subject to BIER forwarding processing.

Nibble: A valid value is 0101. If a value of this field in a BIER packet received by a site device is not 0101, the packet is discarded.

Ver: indicates a version number of a BIER packet.

BitString length (BitString Length, BSL): A value ranges from 1 to 7.

Entropy: for selecting a path when equal-cost paths exist. Specifically, a same path is selected for packets with same bit string and entropy values.

$R_{SV}$: a reserved bit. A default value is 0.

Differentiated services code point (Differentiated Services Code Point, DSCP): indicates a priority of a packet, which determines a priority of packet transmission.

Proto: a next-layer protocol identifier, which identifies a payload type after a BIERv6 packet header.

Bit forwarding ingress router (Bit Forwarding Ingress Router identity, BFIR-ID): indicates an identifier of an ingress device through which a multicast packet enters a BIER domain.

Bit string (Bit String): a bit string, where each bit corresponds to a BIER device in a BFER domain, and if the bit is set to 1, it indicates that a packet needs to be forwarded to a corresponding BIER device.

Step 805: The site device 3 sends the multicast packet 2 to the site device 5 through an SD-WAN tunnel 2.

After obtaining the multicast packet 2, the site device 3 sends the multicast packet 2 to the site device 5 through the SD-WAN tunnel 2. The site device 3 and the site device 5 may be directly connected, or another network device may be connected between the site device 3 and the site device 5. When the another network device is connected between the site device 3 and the site device 5, the another network device forwards the multicast packet 2 based on a destination address (that is, the IP address of the site device 5) in the first SD-WAN tunnel encapsulation header of the multicast packet 2.

Step 806: The site device 3 sends the multicast packet 3 to a site device 6 through an SD-WAN tunnel 3.

In this embodiment, step 806 is similar to step 805. For details, refer to step 805. Details are not described herein again.

Step 807: The site device 5 sends the multicast data in the multicast packet 2 to a receiving device 1.

After the site device 5 receives the multicast packet 2, the site device 5 decapsulates the first SD-WAN tunnel header in the multicast packet 2. Because the destination address in the second BIERv6 header in the multicast packet 2 is an SID of the site device 5, the site device 5 queries the BIER forwarding table based on the bit string in the second BIERv6 header. In a process in which the site device 5 queries the BIER forwarding table based on the bit string, the BIER forwarding table on the site device 5 does not include a forwarding table entry that matches the bit string.

Therefore, the site device 5 may determine that the site device 5 is an end point of BIER forwarding. The site device 5 decapsulates the second BIERv6 header in the multicast packet 2, and sends the multicast data to the receiving device 1 based on indication of the multicast data.

Step 808: The site device 6 sends the multicast data in the multicast packet 3 to a receiving device 2.

In this embodiment, step 808 is similar to step 807. For details, refer to step 807. Details are not described herein again.

FIG. 12 is a schematic flowchart of a multicast communication method 1200 according to an embodiment of this application. As shown in FIG. 12, the multicast communication method 1200 includes the following steps 1201 to 1203.

Step 1201: A first site device receives a first packet, where the first packet includes a first BIER header and multicast data, and the first BIER header indicates a set of destination nodes of the multicast data.

In this embodiment, the multicast communication method 1200 is for implementing the method 800 in the foregoing embodiment. When the multicast communication method 1200 is for implementing the foregoing method 800, the first site device may be the site device 3 in the foregoing method 800, and the first packet may be the multicast packet 1 in the foregoing method 800.

Optionally, the first site device is CPE or a POP site device.

Step 1202: The first site device generates a second packet based on the first packet, where the second packet includes a first SD-WAN tunnel encapsulation header, a second BIER header, and the multicast data, a destination address of the first SD-WAN tunnel encapsulation header is an IP address of a second site device, the IP address of the second site device is an egress address of a first SD-WAN tunnel between the first site device and the second site device, and the second BIER header indicates the set of destination nodes of the multicast data.

Correspondingly, the second packet may be the multicast packet 2 in the method 800, and the second site device may be the site device 5 in the method 800.

Step 1203: The first site device sends the second packet to the second site device through the first SD-WAN tunnel.

Correspondingly, the first SD-WAN tunnel may be the SD-WAN tunnel 2 between the site device 3 and the site device 5 in the foregoing method 800.

Optionally, an extended GRE header is further encapsulated between the first SD-WAN tunnel header and the second BIER header, and a protocol type field in the extended GRE header indicates that a next header of the extended GRE header is a BIER header.

In this solution, the extended GRE header is encapsulated between the SD-WAN tunnel header and the BIER header, and the extended GRE header indicates that the next header is a BIER header. Therefore, modifications to the conventional technologies are reduced as much as possible while implementing coupling between the SD-WAN tunnel and BIER forwarding, to improve implementability of the solution.

Optionally, the first site device is CPE or a POP site device.

Optionally, the first site device determines, based on a bit string in the first BIER header and a BIER forwarding table, that a next-hop site is a first site. A target site device is located in the first site. The first site device determines, based on the first site, to send the second packet to the second site device through the first SD-WAN tunnel.

In this solution, if a site device has the BIER capability, the site device first determines a next-hop site based on a BIER forwarding table, and then determines, based on a mapping relationship between the next-hop site and an SD-WAN tunnel, an SD-WAN tunnel for forwarding a multicast packet. In this way, coupling between the SD-WAN tunnel and the BIER multicast is implemented, to ensure that an intermediate node does not need to sense a multicast service and reduce deployment complexity of a multicast service.

Optionally, the first site device sends first BIER information to a third site device. The first BIER information includes at least one of the following information: a BFR-ID of the first site device and a BFR-prefix of the first site device. The first site device receives second BIER information advertised by the target site device. The second BIER information includes one or more of the following information: a BFR-ID of the target site device and a BFR-prefix of the target site device.

Optionally, the first BIER information or the second BIER information is carried in a BGP packet.

Optionally, the BGP packet includes a BGP shortest path first SPF address family packet, a BGP link state LS address family packet, or a BGP SD-WAN address family packet.

Optionally, the first BIER information or the second BIER information is carried in a prefix network layer reachability information prefix NLRI field in the BGP SPF address family packet or the BGP LS address family packet.

Specifically, for a manner of carrying the first BIER information and the second BIER information, refer to descriptions in the embodiments corresponding to FIG. 6 and FIG. 7. Details are not described herein again.

Optionally, the first site device generates a third packet based on the first packet. The third packet includes a second SD-WAN tunnel encapsulation header, a third BIER header, and the multicast data. A destination address of the second SD-WAN tunnel encapsulation header is an IP address of a third site device. The IP address of the third site device is an egress address of a second SD-WAN tunnel between the first site device and the third site device. The third BIER header indicates the set of destination nodes of the multicast data. The first site device sends the third packet to the third site device through the second SD-WAN tunnel.

For example, when the multicast communication method 1200 is for implementing the foregoing method 800, the third site device may be the site device 6 in the foregoing method 800, and the third packet may be the multicast packet 3 in the foregoing method 800.

FIG. 13 is a schematic flowchart of a multicast communication method 1300 according to an embodiment of this application. As shown in FIG. 13, the multicast communication method 1300 provided in this embodiment of this application includes the following steps 1301 to 1302.

Step 1301: A first site device sends a first BGP packet to a second site device, where the first BGP packet carries first BIER information, and the first BIER information includes a BIER forwarding router identifier BFR-ID of the first site device.

Step 1302: The first site device receives a second BGP packet advertised by the second site device, where the second BGP packet carries second BIER information, and the second BIER information includes a BFR-ID of the second site device.

In this embodiment, the multicast communication method 1300 is for implementing the embodiment corresponding to FIG. 6. When the multicast communication method 1300 is for implementing the embodiment corresponding to FIG. 6, the first site device may be the site device 3, and the second site device may be the site device 1 or the site device 5.

Optionally, the first site device generates a first BIER forwarding table entry based on the second BGP packet, where the first BIER forwarding table entry records a mapping relationship between the BFR-ID of the second site device and a next-hop site, and a BFR-ID in the first BIER forwarding table entry indicates a destination device of BIER forwarding.

Specifically, the destination device is represented by the BFR-ID of the second site device, and the next-hop site is calculated based on a topology of the SD-WAN by using the second site device as a destination address. For site devices in the SD-WAN, each site device advertises, to another site device, information about an SD-WAN tunnel established between the site device and the another site device. Therefore, after the first site device receives SD-WAN tunnel information advertised by other site devices, the first site device can obtain tunnel connection relationships between the site devices in the SD-WAN, to be specific, obtain the topology of the entire SD-WAN. In this way, when using the second site device as a destination address, the first site device can calculate, based on the topology of the SD-WAN, the next-hop site of the second site device.

Specifically, the first site device may be the site device 3 in the embodiment corresponding to FIG. 6. For a process in which the first site device generates the BIER forwarding table entry based on the second BGP packet, refer to the process in which the site device 3 generates the BIER forwarding table entry in the embodiment corresponding to FIG. 6. Details are not described herein again.

Optionally, the method 1300 further includes: The second site device generates a second BIER forwarding table entry based on the first BGP packet. The second BIER forwarding table entry records a mapping relationship between the BFR-ID of the first site device and a next-hop site. A BFR-ID in the second BIER forwarding table entry indicates a destination device of BIER forwarding.

Specifically, the first site device may be the site device 3 in the embodiment corresponding to FIG. 5, and the second site device may be the site device 5 in the embodiment corresponding to FIG. 5. For a process in which the first site device establishes the SD-WAN tunnel and stores the mapping relationship between the next-hop site and the SD-WAN tunnel, refer to the process in which the site device 3 generates the forwarding table in the embodiment corresponding to FIG. 5. Details are not described herein again.

Optionally, the method 1300 further includes: The first site device determines, based on a topology of an SD-WAN, to reach a next-hop site of the second site device.

Optionally, the method 1300 further includes: The first site device receives first SD-WAN tunnel information advertised by the third site device. The first SD-WAN tunnel information includes an IP address of the third site device and information about a site to which the third site device belongs. The first site device establishes a first SD-WAN tunnel between the first site device and the third site device based on the first SD-WAN tunnel information, and stores a first mapping relationship between a next-hop site and the first SD-WAN tunnel. The next-hop site in the first mapping relationship is the site to which the third site device belongs.

To be specific, when the first site device establishes the first SD-WAN tunnel with the third site device, if the next-hop site of the first site device is the third site device, an egress interface of the first site device may point to the first SD-WAN tunnel between the first site device and the third site device, to be specific, a packet can be forwarded to a corresponding next-hop site through the first SD-WAN tunnel.

Specifically, the first site device may be the site device 1 in the embodiment corresponding to FIG. 5, the third site device may be the site device 3 in the embodiment corresponding to FIG. 5, and the second site device may be the site device 5 in the embodiment corresponding to FIG. 5. For a process in which the first site device, the second site device, and the third site device establish the SD-WAN tunnel and store the mapping relationship between the next-hop site and the SD-WAN tunnel, refer to a process in which the site device generates the forwarding table in the embodiment corresponding to FIG. 5. Details are not described herein again.

Optionally, the method 1300 further includes: The third site device receives second SD-WAN tunnel information advertised by the second site device. The second SD-WAN tunnel information includes an IP address of the second site device and information about a site to which the second site device belongs. The third site device establishes a second SD-WAN tunnel between the third site device and the second site device based on the second SD-WAN tunnel information, and stores a second mapping relationship between a next-hop site and the second SD-WAN tunnel. The next-hop site in the second mapping relationship is the site to which the second site device belongs.

To be specific, the second SD-WAN tunnel is further established between the third site device and the second site device. The third site device may establish the second mapping relationship between the next-hop site and the second SD-WAN tunnel, so that when a next-hop site of a packet is the second site device, the packet is sent through the second SD-WAN tunnel.

Optionally, the method 1300 further includes: The first site device receives third SD-WAN tunnel information advertised by the second site device. The third SD-WAN tunnel information includes an IP address of the second site device and information about a site to which the second site device belongs. The first site device establishes a third SD-WAN tunnel between the first site device and the second site device based on the third SD-WAN tunnel information, and stores a third mapping relationship between a next-hop site and the third SD-WAN tunnel. The next-hop site in the third mapping relationship is the site to which the second site device belongs.

Optionally, the method 1300 further includes: The first site device receives a first BIER packet. The first BIER packet includes a first BIER header and multicast data. The first BIER header indicates a set of destination nodes of the multicast data. The first site device determines, based on the first BIER header, the first BIER forwarding table entry, and the first mapping relationship, to forward the multicast data through the first SD-WAN tunnel.

Optionally, the method 1300 further includes: The first site device receives a first BIER packet, where the first BIER packet includes a first BIER header and multicast data, and the first BIER header indicates a set of destination nodes of the multicast data. The first site device determines, based on the first BIER header, the first BIER forwarding table entry, and the third mapping relationship, to forward the multicast data through the third SD-WAN tunnel.

To implement the foregoing embodiments, this application further provides a communication apparatus. FIG. 14 is a schematic diagram of a structure of a communication apparatus 1400 according to an embodiment of this application. The communication apparatus 1400 shown in FIG.

14 is, for example, the site device 3 in the embodiments corresponding to FIG. 5 or FIG. 6 and the method 800, or the first site device in the method 1200.

As shown in FIG. 14, the communication apparatus 1400 belongs to a first site device in an SD-WAN. The communication apparatus 1400 includes: a receiving module 1401, configured to receive a first packet, where the first packet includes a first bit index explicit replication BIER header and multicast data, and the first BIER header indicates a set of destination nodes of the multicast data; a processing module 1402, configured to generate a second packet based on the first packet, where the second packet includes a first SD-WAN tunnel encapsulation header, a second BIER header, and the multicast data, a destination address of the first SD-WAN tunnel encapsulation header is an IP address of a second site device, the IP address of the second site device is an egress address of a first SD-WAN tunnel between the first site device and the second site device, and the second BIER header indicates the set of destination nodes of the multicast data; and a sending module 1403, configured to send the second packet to the second site device through the first SD-WAN tunnel.

In a possible implementation, an extended generic routing encapsulation GRE header is further encapsulated between the first SD-WAN tunnel header and the second BIER header, and a protocol type field in the extended GRE header indicates that a next header next header of the extended GRE header is a BIER header.

In a possible implementation, the processing module 1402 is further configured to: determine, based on a bit string in the first BIER header and a BIER forwarding table, that a next-hop site is a first site, where a target site device is located in the first site: and determine, based on the first site, to send the second packet to the second site device through the first SD-WAN tunnel.

In a possible implementation, the sending module 1403 is further configured to send first BIER information to a third site device. The first BIER information includes at least one of the following information: a BIER forwarding router identifier BFR-ID of the first site device and a BIER forwarding router advertisement prefix BFR-prefix of the first site device. The receiving module 1401 is further configured to receive second BIER information advertised by the target site device. The second BIER information includes one or more of the following information: a BFR-ID of the target site device and a BFR-prefix of the target site device.

In a possible implementation, the first BIER information or the second BIER information is carried in a BGP packet.

In a possible implementation, the BGP packet includes a BGP shortest path first SPF address family packet, a BGP link state LS address family packet, or a BGP SD-WAN address family packet.

In a possible implementation, the first BIER information or the second BIER information is carried in a prefix network layer reachability information prefix NLRI field in the BGP SPF address family packet or the BGP LS address family packet.

In a possible implementation, the processing module 1402 is further configured to generate a third packet based on the first packet. The third packet includes a second SD-WAN tunnel encapsulation header, a third BIER header, and the multicast data. A destination address of the second SD-WAN tunnel encapsulation header is an IP address of a third site device. The IP address of the third site device is an egress address of a second SD-WAN tunnel between the first site device and the third site device. The third BIER header indicates the set of destination nodes of the multicast data. The sending module 1403 is further configured to send the third packet to the third site device through the second SD-WAN tunnel.

In a possible implementation, the first site device is CPE or a POP site device.

In another possible embodiment, the communication apparatus 1400 may belong to a second site device in an SD-WAN. In the communication apparatus 1400, a receiving module 1401 is configured to receive, through a first SD-WAN tunnel, a first packet sent by a first site device. The first packet includes a first SD-WAN tunnel encapsulation header, a first BIER header, and multicast data. A destination address of the first SD-WAN tunnel encapsulation header is an IP address of the second site device. The IP address of the second site device is an egress address of the first SD-WAN tunnel between the first site device and the second site device. The second BIERv6 header indicates a set of destination nodes of the multicast data. A processing module 1402 is configured to generate a second packet based on the first packet. The second packet includes the multicast data. A sending module 1403 is configured to forward the second packet.

In a possible implementation, an extended GRE header is further encapsulated between the first SD-WAN tunnel header and the first BIER header, and a protocol type field in the extended GRE header indicates that a next header next header of the extended GRE header is a BIER header.

In a possible implementation, the second packet includes a second SD-WAN tunnel encapsulation header, a second BIER header, and the multicast data. A destination address of the second SD-WAN tunnel encapsulation header is an IP address of a third site device. The IP address of the third site device is an egress address of a second SD-WAN tunnel between the second site device and the third site device. The second BIER header indicates the set of destination nodes of the multicast data. The sending module is further configured to send the second packet to the third site device through the second SD-WAN tunnel.

FIG. 15 is a schematic diagram of a structure of a communication apparatus 1500 according to an embodiment of this application. The communication apparatus 1500 shown in FIG. 15 is, for example, the site device 3 in the embodiments corresponding to FIG. 5 or FIG. 6 or the first site device in the method 1300.

As shown in FIG. 15, the communication apparatus 1500 is a first site device in an SD-WAN. The communication apparatus 1500 includes: a sending module 1501, configured to send a first BGP packet to a second site device, where the first BGP packet carries first BIER information, and the first BIER information includes a BIER forwarding router identifier BFR-ID of the first site device; a receiving module 1502, configured to receive a second BGP packet advertised by the second site device, where the second BGP packet carries second BIER information, and the second BIER information includes a BFR-ID of the second site device; and a processing module 1503, configured to generate a first BIER forwarding table entry based on the second BGP packet, where the first BIER forwarding table entry records a mapping relationship between the BFR-ID of the second site device and a next-hop site, and a BFR-ID in the first BIER forwarding table entry indicates a destination device of BIER forwarding.

In a possible implementation, the processing module 1503 is further configured to determine, based on a topology of an SD-WAN, to reach a next-hop site of the second site device.

In a possible implementation, the receiving module 1502 is further configured to receive first SD-WAN tunnel information advertised by the third site device. The first SD-WAN tunnel information includes an IP address of the third site device and information about a site to which the third site device belongs. The processing module 1503 is further configured to establish a first SD-WAN tunnel between the first site device and the third site device based on the first SD-WAN tunnel information, and store a first mapping relationship between a next-hop site and the first SD-WAN tunnel. The next-hop site in the first mapping relationship is the site to which the third site device belongs.

In a possible implementation, the receiving module 1502 is further configured to receive third SD-WAN tunnel information advertised by the second site device. The third SD-WAN tunnel information includes an IP address of the second site device and information about a site to which the second site device belongs. The processing module 1503 is further configured to establish a third SD-WAN tunnel between the first site device and the second site device based on the third SD-WAN tunnel information, and store a third mapping relationship between a next-hop site and the third SD-WAN tunnel. The next-hop site in the third mapping relationship is the site to which the second site device belongs.

In a possible implementation, the receiving module 1502 is further configured to receive a first BIER packet. The first BIER packet includes a first BIER header and multicast data, and the first BIER header indicates a set of destination nodes of the multicast data. The processing module 1503 is further configured to determine, based on the first BIER header, the first BIER forwarding table entry, and the first mapping relationship, to forward the multicast data through the first SD-WAN tunnel.

In a possible implementation, the receiving module 1502 is further configured to receive a first BIER packet. The first BIER packet includes a first BIER header and multicast data, and the first BIER header indicates a set of destination nodes of the multicast data. The processing module 1503 is further configured to determine, based on the first BIER header, the first BIER forwarding table entry, and the third mapping relationship, to forward the multicast data through the third SD-WAN tunnel.

Figure 16:
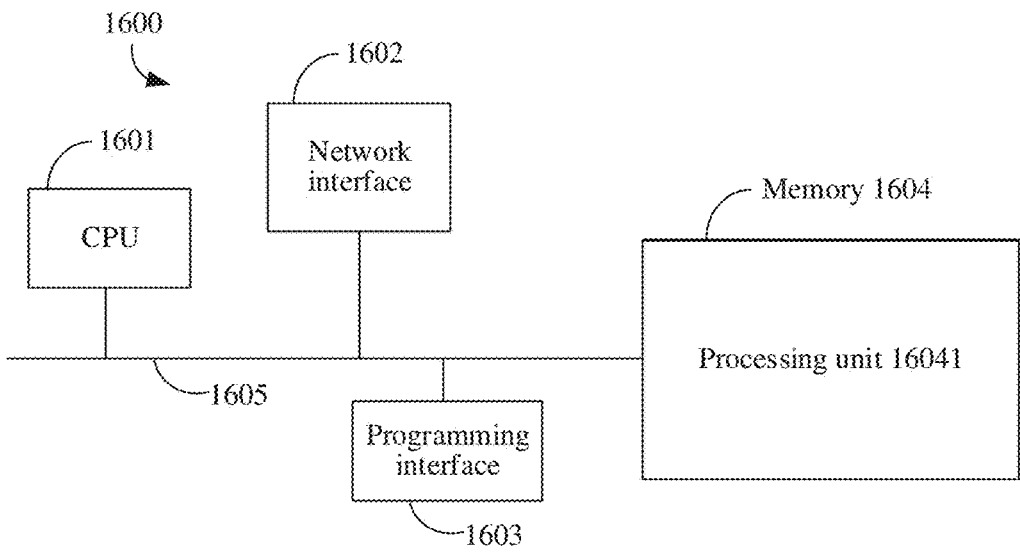
FIG. 16 is a schematic diagram of a structure of a network device 1600 according to an embodiment of this application.

FIG. 16 is a schematic diagram of a structure of a communication apparatus 1600 according to an embodiment of this application. The communication apparatus 1600 shown in FIG. 16 may be configured to perform the steps performed by the first site device in the foregoing embodiments. Although the communication apparatus 1600 shown in FIG. 16 shows some specific features, a person skilled in the art may be aware, from embodiments of this application, that, for brevity, FIG. 16 does not show various other features, to avoid confusing more related aspects of implementations disclosed in embodiments of this application. For this purpose, as an example, in some implementations, the communication apparatus 1600 includes one or more processors (for example, a CPU) 1601, a network interface 1602, a programming interface 1603, a memory 1604, and one or more communication buses 1605 that are configured to interconnect various components. In some other implementations, some functional components or units may be omitted or added to the communication apparatus 1600 based on the foregoing example.

In some implementations, the network interface 1602 is configured to connect to one or more other communication apparatuses/servers in a network system. In some implementations, the communication bus 1605 includes a circuit that performs interconnection and controls communication between system components. The memory 1604 may include a non-volatile memory, for example, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The memory 1604 may also include a volatile memory, and the volatile memory may be a random access memory (random access memory, RAM), and is used as an external cache.

In some implementations, a non-transitory computer-readable storage medium of the memory 1604 stores the following programs, modules, and data structures, or a subset thereof, for example, includes an obtaining unit (not shown in the figure), a sending unit (not shown in the figure), and a processing unit 16041.

In a possible embodiment, the communication apparatus 1600 may have any function of the site device in the method embodiments corresponding to FIG. 12 to FIG. 14.

It should be understood that the communication apparatus 1600 corresponds to the first site device in the foregoing method embodiments. The modules in the communication apparatus 1600 and the foregoing other operations and/or functions are separately for performing various steps and methods performed by the first communication apparatus in the foregoing method embodiments. For specific details, refer to the method embodiments corresponding to FIG. 12 to FIG. 14. For brevity, details are not described herein again.

It should be understood that in this application, the network interface 1602 on the communication apparatus 1600 may perform data receiving and sending operations, or the processor may invoke program code in the memory, and implement functions of the transceiver unit in cooperation with the network interface 1602 when required.

In various implementations, the communication apparatus 1600 is configured to perform the multicast communication method provided in embodiments of this application, for example, perform the multicast communication method corresponding to the embodiments shown in FIG. 12 to FIG. 13.

Figure 17:
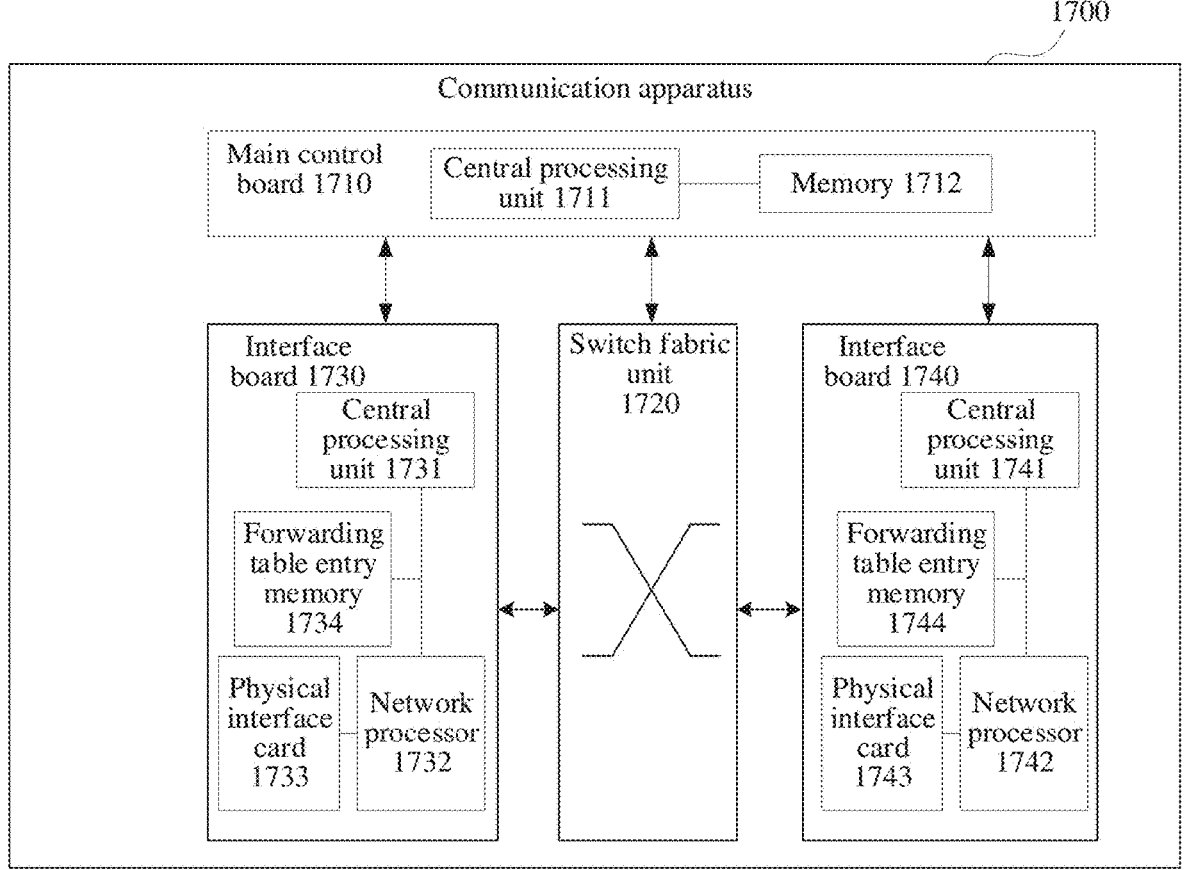
FIG. 17 is a schematic diagram of a structure of a network device 1700 according to an embodiment of this application.

A specific structure of the communication apparatus shown in FIG. 16 in this application may be shown in FIG. 17.

FIG. 17 is a schematic diagram of a structure of a communication apparatus 1700 according to an embodiment of this application. The communication apparatus 1700 shown in FIG. 17 may be configured to perform steps performed by any one of the first site device, the second site device, a transmitting device, or a receiving device in the foregoing embodiments. The communication apparatus 1700 includes a main control board 1710 and an interface board 1730.

The main control board 1710 is also referred to as a main processing unit (main processing unit, MPU) or a route processor (route processor). The main control board 1710 is configured to control and manage components in the communication apparatus 1700, including route computation, device management, device maintenance, and protocol processing functions. The main control board 1710 includes a central processing unit 1711 and a memory 1712.

The interface board 1730 is also referred to as a line processing unit (line processing unit, LPU), a line card (line card), or a service board. The interface board 1730 is configured to provide various service interfaces, and forward a data packet. The service interfaces include, but are not limited to, an Ethernet interface, a POS (Packet over SONET/SDH) interface, and the like. The interface board 1730 includes a central processing unit 1731, a network processor 1732, a physical interface card (physical interface card, PIC) 1733, and a forwarding table entry memory 1734.

The central processing unit 1731 on the interface board 1730 is configured to control and manage the interface board 1730, and communicate with the central processing unit 1711 on the main control board 1710.

The network processor 1732 is configured to implement packet forwarding processing. A form of the network processor 1732 may be a forwarding chip.

The physical interface card 1733 is configured to implement an interconnection function at a physical layer. Original traffic enters the interface board 1730 from the physical interface card 1733, and a processed packet is sent from physical interface card 1733. The physical interface card 1733 includes at least one physical interface. The physical interface is also referred to as a physical port, and the physical interface may be a flexible Ethernet (Flexible Ethernet, FlexE) physical interface. In some embodiments, the central processing unit 1731 of the interface board 1730 may also perform a function of the network processor 1732, for example, implement software forwarding based on a general-purpose CPU. In this way, the interface board 1730 does not need the network processor 1732.

Optionally, the communication apparatus 1700 includes multiple interface boards. For example, the communication apparatus 1700 further includes an interface board 1740. The interface board 1740 includes a central processing unit 1741, a network processor 1742, a physical interface card 1743, and a forwarding table entry memory 1744.

Optionally, the communication apparatus 1700 further includes a switching board 1720. The switching board 1720 may also be referred to as a switch fabric unit (switch fabric unit, SFU). When the communication apparatus includes a plurality of interface boards 1730, the switching board 1720 is configured to exchange data between the interface boards. For example, the interface board 1730 and the interface board 1740 may communicate with each other through the switching board 1720.

The main control board 1710 is coupled with the interface board. For example, the main control board 1710, the interface board 1730, the interface board 1740, and the switching board 1720 are connected by a system bus and/or a system backplane to communicate with each other. In a possible implementation, an inter-process communication (inter-process communication, IPC) channel is established between the main control board 1710 and the interface board 1730, and communication is performed between the main control board 1710 and the interface board 1730 through the IPC channel.

Logically, the communication apparatus 1700 includes a control plane and a forwarding plane. The control plane includes the main control board 1710 and the central processing unit 1731. The forwarding plane includes components for performing forwarding, for example, the forwarding table entry memory 1734, the physical interface card 1733, and the network processor 1732. The control plane implements functions such as advertising a route, generating a forwarding table, processing signaling and a protocol packet, and configuring and maintaining a status of a device. The control plane delivers the generated forwarding table to the forwarding plane. On the forwarding plane, the network processor 1732 searches the forwarding table delivered by the control plane to forward a packet received by the physical interface card 1733. The forwarding table delivered by the control plane may be stored in the forwarding table entry memory 1734. In some embodiments, the control plane and the forwarding plane may be completely separated, and are not on a same device.

It should be understood that, in this embodiment of this application, operations on the interface board 1740 are the same as operations on the interface board 1730. For brevity, details are not described again. It should be understood that the communication apparatus 1700 in this embodiment may correspond to the first communication apparatus in the foregoing method embodiments. The main control board 1710, the interface board 1730, and/or the interface board 1740 in the communication apparatus 1700 may implement the functions possessed by and/or the steps performed by the first communication apparatus in the foregoing method embodiments. For brevity, details are not described herein again.

It should be noted that there may be one or more main control boards. When there are a plurality of main control boards, the main control boards may include an active main control board and a standby main control board. There may be one or more interface boards, and the communication apparatus with a stronger data processing capability provides more interface boards. There may also be one or more physical interface cards on the interface board. There may be no switch fabric unit or one or more switch fabric units. When there are a plurality of switch fabric units, load balancing and redundancy backup may be implemented together. In a centralized forwarding architecture, the communication apparatus may not need a switch fabric unit, and the interface board provides a function of processing service data of an entire system. In a distributed forwarding architecture, the communication apparatus may include at least one switch fabric unit, and exchange data between a plurality of interface boards through the switch fabric unit, to provide a large-capacity data exchange and processing capability. Optionally, the form of the communication apparatus may alternatively be only one board, to be specific, there is no switch fabric unit, and functions of the interface board and the main control board are integrated on the board. In this case, a central processing unit on the interface board and a central processing unit on the main control board may be combined into one central processing unit on the board, to implement functions obtained after the two are superimposed. Which architecture is specifically used depends on a specific networking deployment scenario, and is not uniquely limited herein.

It should be understood that the communication apparatuses in the foregoing product forms separately have any function of the first site device in the foregoing method embodiments. Details are not described herein again.

Further, embodiments of this application further provide a computer program product. When the computer program product is run on a network device, the network device is enabled to perform the method performed by any network device in the method embodiments corresponding to FIG. 12 and FIG. 13.

Embodiments of this application further provide a chip system, including a processor and an interface circuit. The interface circuit is configured to receive instructions and transmit the instructions to the processor. The processor is configured to implement the method in any one of the foregoing method embodiments.

Optionally, the chip system further includes a memory, and there may be one or more processors in the chip system. The processor may be implemented through hardware, or may be implemented through software. When the processor is implemented through the hardware, the processor may be a logic circuit, an integrated circuit, or the like. When the processor is implemented through the software, the processor may be a general-purpose processor, and the method in any one of the foregoing method embodiments is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

The foregoing describes embodiments of this application in detail. Steps in the methods in embodiments of this application may be sequentially scheduled, combined, or deleted according to an actual requirement. Modules in the apparatus in embodiments of this application may be divided, combined, or deleted according to an actual requirement.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined according to A. However, it should be further understood that determining B based on A does not mean that B is determined based only on A. B may alternatively be determined based on A and/or other information.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

The invention claimed is:

1. A multicast communication method, wherein the method comprises:
   receiving, by a first site device, a first packet, wherein the first packet comprises a first bit index explicit replication (BIER) header and multicast data, and the first BIER header indicates a set of destination nodes of the multicast data;
   generating, by the first site device, a second packet based on the first packet, wherein the second packet comprises a first software-defined wide area network (SD-WAN) tunnel encapsulation header, a second BIER header, and the multicast data, wherein a destination address of the first SD-WAN tunnel encapsulation header is an internet protocol (IP) address of a second site device, wherein the IP address of the second site device is an egress address of a first SD-WAN tunnel between the first site device and the second site device, and wherein the second BIER header indicates the set of destination nodes of the multicast data; and
   sending, by the first site device, the second packet to the second site device through the first SD-WAN tunnel.

2. The method according to claim 1, wherein an extended generic routing encapsulation (GRE) header is further encapsulated between the first SD-WAN tunnel encapsulation header and the second BIER header, and wherein a protocol type field in the extended GRE header indicates that a next header of the extended GRE header is a BIER header.

3. The method according to claim 1, wherein the method further comprises:
   determining, by the first site device, based on a bit string in the first BIER header and a BIER forwarding table, that a next-hop site is a first site, wherein a target site device is located in the first site; and
   determining, by the first site device, based on the first site, to send the second packet to the second site device through the first SD-WAN tunnel.

4. The method according to claim 1, wherein the method further comprises:
   sending, by the first site device, first BIER information to a third site device, wherein the first BIER information comprises at least one of a BIER forwarding router identifier (BFR-ID) of the first site device or a BIER forwarding router advertisement prefix (BFR-prefix) of the first site device; and
   receiving, by the first site device, second BIER information advertised by a target site device, wherein the second BIER information comprises one or more of a BFR-ID of the target site device or a BFR-prefix of the target site device.

5. The method according to claim 4, wherein the first BIER information or the second BIER information is carried in a border gateway protocol (BGP) packet.

6. The method according to claim 5, wherein the BGP packet comprises a BGP shortest path first (SPF) address family packet, a BGP link state (LS) address family packet, or a BGP SD-WAN address family packet.

7. The method according to claim 6, wherein the first BIER information or the second BIER information is carried in a prefix network layer reachability information prefix (NLRI) field in the BGP SPF address family packet or the BGP LS address family packet.

8. The method according to claim 1, wherein the method further comprises:
   generating, by the first site device, a third packet based on the first packet, wherein the third packet comprises a second SD-WAN tunnel encapsulation header, a third BIER header, and the multicast data, a destination address of the second SD-WAN tunnel encapsulation header is an IP address of a third site device, the IP address of the third site device is an egress address of a second SD-WAN tunnel between the first site device and the third site device, and the third BIER header indicates the set of destination nodes of the multicast data; and
   sending, by the first site device, the third packet to the third site device through the second SD-WAN tunnel.

9. The method according to claim 1, wherein the first site device is customer-premises equipment (CPE) or a point of presence (POP) site device.

10. A multicast communication method, comprising:
    receiving, by a second site device through a first software-defined wide area network (SD-WAN) tunnel, a first packet sent by a first site device, wherein the first packet comprises a first SD-WAN tunnel encapsulation header, a first bit index explicit replication (BIER) header, and multicast data, a destination address of the first SD-WAN tunnel encapsulation header is an internet protocol (IP) address of the second site device, the IP address of the second site device is an egress address of the first SD-WAN tunnel between the first site device and the second site device, and the first BIER header indicates a set of destination nodes of the multicast data;
    generating, by the second site device, a second packet based on the first packet, wherein the second packet comprises the multicast data; and
    forwarding, by the second site device, the second packet.

11. The method according to claim 10, wherein an extended generic routing encapsulation (GRE) header is further encapsulated between the first SD-WAN tunnel encapsulation header and the first BIER header, and a protocol type field in the extended GRE header indicates that a next header of the extended GRE header is a BIER header.

12. The method according to claim 10, wherein the second packet comprises a second SD-WAN tunnel encapsulation header, a second BIER header, and the multicast data, wherein a destination address of the second SD-WAN tunnel encapsulation header is an IP address of a third site device, wherein the IP address of the third site device is an egress address of a second SD-WAN tunnel between the second site device and the third site device, and wherein the second BIER header indicates the set of destination nodes of the multicast data; and
    wherein the forwarding, by the second site device, the second packet comprises:
      sending, by the second site device, the second packet to the third site device through the second SD-WAN tunnel.

13. A first site device, comprising:
    a memory storing instructions; and
    at least one processor, wherein the instructions, when executed by the at least one processor, cause the first site device to:
    receive a first packet, wherein the first packet comprises a first bit index explicit replication (BIER) header and multicast data, and the first BIER header indicates a set of destination nodes of the multicast data;

generate a second packet based on the first packet, wherein the second packet comprises a first software-defined wide area network (SD-WAN) tunnel encapsulation header, a second BIER header, and the multicast data, wherein a destination address of the first SD-WAN tunnel encapsulation header is an internet protocol (IP) address of a second site device, wherein the IP address of the second site device is an egress address of a first SD-WAN tunnel between the first site device and the second site device, and wherein the second BIER header indicates the set of destination nodes of the multicast data; and send the second packet to the second site device through the first SD-WAN tunnel.

14. The first site device according to claim 13, wherein an extended generic routing encapsulation (GRE) header is further encapsulated between the first SD-WAN tunnel encapsulation header and the second BIER header, and wherein a protocol type field in the extended GRE header indicates that a next header of the extended GRE header is a BIER header.

15. The first site device according to claim 13, wherein when the instructions are executed by the at least one processor, the first site device is further caused to:

determine, based on a bit string in the first BIER header and a BIER forwarding table, that a next-hop site is a first site, wherein a target site device is located in the first site; and determine, based on the first site, to send the second packet to the second site device through the first SD-WAN tunnel.

16. The first site device according to claim 13, wherein when the instructions are executed by the at least one processor, the first site device is further caused to:

send first BIER information to a third site device, wherein the first BIER information comprises at least one of a BIER forwarding router identifier (BFR-ID) of the first site device or a BIER forwarding router advertisement prefix (BFR-prefix) of the first site device; and receive second BIER information advertised by a target site device, wherein the second BIER information comprises one or more of a BFR-ID of the target site device or a BFR-prefix of the target site device.

17. The first site device according to claim 16, wherein the first BIER information or the second BIER information is carried in a border gateway protocol (BGP) packet.

18. The first site device according to claim 17, wherein the BGP packet comprises a BGP shortest path first (SPF) address family packet, a BGP link state (LS) address family packet, or a BGP SD-WAN address family packet.

19. The first site device according to claim 18, wherein the first BIER information or the second BIER information is carried in a prefix network layer reachability information prefix (NLRI) field in the BGP SPF address family packet or the BGP LS address family packet.

20. The first site device according to claim 13, wherein when the instructions are executed by the at least one processor, the first site device is further caused to:

generate a third packet based on the first packet, wherein the third packet comprises a second SD-WAN tunnel encapsulation header, a third BIER header, and the multicast data, a destination address of the second SD-WAN tunnel encapsulation header is an IP address of a third site device, the IP address of the third site device is an egress address of a second SD-WAN tunnel between the first site device and the third site device, and the third BIER header indicates the set of destination nodes of the multicast data; and send the third packet to the third site device through the second SD-WAN tunnel.

* * * * *